(12) United States Patent  
Ito et al.

(10) Patent No.: US 6,301,230 B1  
(45) Date of Patent: Oct. 9, 2001

(54) RADIO PAGING SYSTEM

(75) Inventors: Shogo Ito, Yokohama; Takayuki Mizuki, Tokyo; Yasushi Yamao, Yokosuka, all of (JP)

(73) Assignee: NTT Mobile Communications Network, Tokyo (JP)

( * ) Notice: Subject to any disclaimer, the term of this patent is extended or adjusted under 35 U.S.C. 154(b) by 0 days.

(21) Appl. No.: 09/031,049

(22) Filed: Feb. 26, 1998

Related U.S. Application Data

(63) Continuation of application No. PCT/JP97/02210, filed on Jun. 26, 1997.

(30) Foreign Application Priority Data

Jun. 27, 1996 (JP) .................................................. 8-167471  
Aug. 2, 1996 (JP) .................................................. 8-205005

(51) Int. Cl.[7] .................................................. H04Q 7/20
(52) U.S. Cl. .................. 370/313; 370/335; 370/342; 340/7.22; 455/458
(58) Field of Search .................. 370/313, 328, 370/342, 335, 331; 375/200, 206, 140; 455/31.2, 38.1, 38.2, 412, 458; 340/7.23, 7.53, 7.22

(56) References Cited

U.S. PATENT DOCUMENTS

| | | | |
|---|---|---|---|
| 5,237,320 | * 8/1993 | Santo et al. | 340/825.44 |
| 5,455,822 | * 10/1995 | Dixon et al. | 370/342 |
| 5,600,703 | * 2/1997 | Dang et al. | 455/31.3 |
| 5,668,803 | * 9/1997 | Tymes et al. | 370/312 |
| 5,673,260 | * 9/1997 | Umeda et al. | 370/342 |
| 5,710,976 | * 1/1998 | Hill et al. | 455/509 |
| 5,722,065 | 2/1998 | Ito et al. | 455/38.3 |
| 5,734,985 | 3/1998 | Ito et al. | 455/503 |
| 5,736,934 | 4/1998 | Nozawa et al. | 340/825.44 |
| 5,805,999 | * 9/1998 | Inoue | 455/462 |
| 5,812,949 | * 9/1998 | Taketsugu | 455/439 |
| 5,850,392 | * 12/1998 | Wang et al. | 370/335 |

FOREIGN PATENT DOCUMENTS

| | | |
|---|---|---|
| 1-117432 | 5/1989 | (JP) . |
| 7-255079 | 10/1995 | (JP) . |

OTHER PUBLICATIONS

Technical Paper of the ICICE, vol. 96, No. 103, (Jun. 20, 1996) pp. 67–74.

* cited by examiner

*Primary Examiner*—Hassan Kizou  
*Assistant Examiner*—Saba Tsegaye  
(74) *Attorney, Agent, or Firm*—Pillsbury Winthrop LLP

(57) ABSTRACT

In a radio paging system wherein a user carrying a radio paging receiver is paged by means of radio waves, and the radio paging receiver sends back a response signal when it has received a paging signal addressed to itself, the response signal is sent back by means of direct sequence modulation using a code uniquely determined in accordance with the base station ID signal, which is different for each base station, and which has been inserted in the paging signal sequence transmitted from the base station, or in accordance with the order of each paging signal within the paging signal sequence. As a result, the response signal can be transmitted at low power from each radio paging receiver, and effective utilization can be made of frequency, regardless of an increase in the number of radio pagers.

14 Claims, 23 Drawing Sheets

FIRST EMBODIMENT

FIRST EMBODIMENT use this address to indicate that there is a base station ID signal (this address is known at each radio paging terminal)

insert base station ID signal here

SECOND EMBODIMENT

THIRD EMBODIMENT

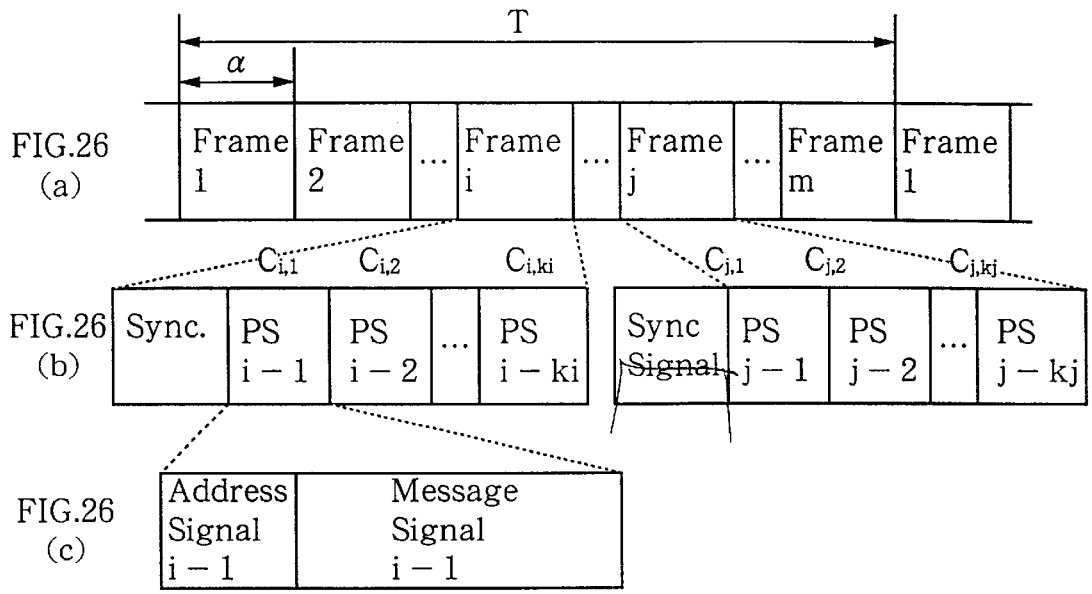
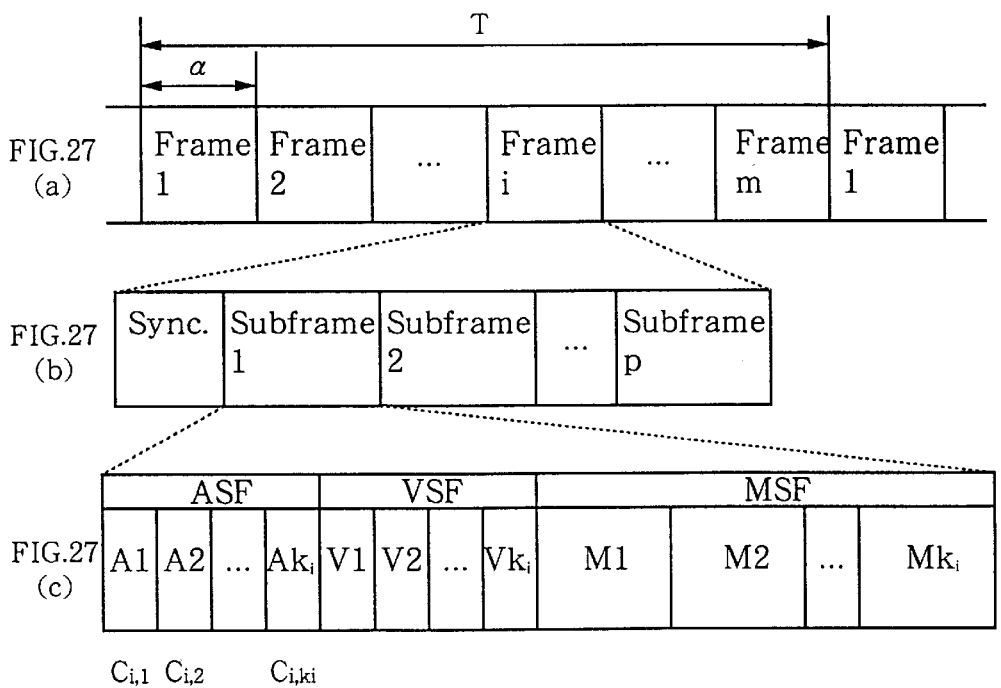

RADIO PAGING SYSTEM

This application is a continuation of PCT/JP97/02210 filed Jun. 26, 1997.

TECHNICAL FIELD

The present invention relates to systems for paging a user carrying a radio pager. It relates in particular to techniques for transmitting a response signal from a radio pager to a base station when that pager has received a paging signal addressed to itself.

BACKGROUND ART

FIG. 1 is a block diagram showing a conventional radio paging system. To page radio paging receiver 106-1 or 106-2 from telephone terminal 101, the number of radio paging receiver 106-1 or 106-2, and the message if there is one, are input from telephone terminal 101. This information is then input to central station 103 via public switched telephone network (PSTN) 102 as a paging request signal. At a central station 103 this paging request signal is converted to a paging signal sequence and transmitted to a plurality (herein denoted by n) of base stations 1041 to 104-n. Base stations 104-1 to 104-n receive this paging signal sequence using line terminators 107, convert it to a radio signal (a radio wave) in transmitter 108, and transmit it simultaneously at the same frequency $F_f$ to radio zones 105-1 to 105-n of each respective base station. Radio paging receivers 106-1 and 106-2 each receive the radio signal at the predetermined frequency $F_f$, and when either of these radio paging receivers detects a paging signal addressed to itself, it notifies the user that he or she has been paged.

FIG. 2 shows an example of the configuration of a paging signal sequence received by a radio paging receiver. This paging signal sequence comprises a frame sequence of period T comprising m frames of signal length α joined together. The i-th frame comprises a synchronization signal and $k_i$ paging signals. Each paging signal comprises an address signal and a message signal. The receive function of a radio paging receiver is activated only during the receiving period of one or more pre-allocated frames of the m frames, whereupon it receives the frame or frames in question. This is called "intermittent receiving" and is intended to extend battery life in a radio paging receiver. For example, on the assumption, that radio paging receivers 106-1 and 106-2 have been allocated to the same frame i, the receive function of these radio paging receivers is activated only in frame i whereupon they receive paging signals in this frame i. Further, if both radio paging receivers 106-1 and 106-2 are paged in the same frame, then for example the paging signal transmitted to radio paging receiver 106-1 is paging signal i-1 having the address signal of this receiver, and the paging signal transmitted to radio paging receiver 106-2 is paging signal i-2 having the address signal of that receiver. When a radio paging receiver has detected a paging signal addressed to itself within the received frame, it outputs an audible tone or other alert, thereby notifying the user that he or she has been paged.

A problem with the radio paging system described above is that because it is a one-way communication system, the caller cannot know whether or not his paging request has reached the desired radio paging receiver. To overcome this problem, a two-way radio paging system has been proposed, wherein a radio pager with a transmission function is, used instead of a receive-only radio paging receiver, so that when a radio pager has detected a paging signal addressed to itself, it transmits a response signal to the base station to the effect that a paging signal has been received.

FIG. 3 is a block diagram showing a conventional two-way radio paging system. In this system, instead of central station 103, base stations 104-1 to 104-n and radio paging receivers 106-1 and 106-2 shown in FIG. 1, there are used central station 111, base stations 112-1 to 112-n and radio pagers 113-1 and 113-2, all of which are capable of two-way communication.

To page radio pager 113-1 or 113-2 from telephone terminal 101, a paging signal sequence is transmitted simultaneously at the same frequency $F_f$ to radio zones 105-1 to 105-n of each respective base station, in the same manner as the prior art example illustrated in FIG. 1. Radio pagers 113-1 and 113-2 each receive this paging signal sequence, and when either of these radio pagers detects a paging signal addressed to itself, it notifies the user that he or she has been paged. Subsequently, the paged radio pager 113-1 or 113-2 transmits to a base station a response signal to the effect that a paging signal has been received. It is also possible at this point to add a short message signal. The base station of the radio zone in which the radio pager is located receives this response signal at receiver 114 (the response signal transmitted by radio pager 113-1 is received by base station 112-1 and the response signal transmitted by radio pager 113-2 is received by base station 112-2), and transmits the response signal via line terminator 107 to central station 111. Central station 111 can then report via telephone network 102 to telephone terminal 101 that paging has been successful.

FIG. 4 shows an example of the configuration of a response signal transmitted by a radio pager. This response signal comprises a synchronization signal, the radio pager ID, and the response information. The response information can include a short message in, addition to a response to the effect that a paging signal has been received.

It is assumed herein that as in the case of a mobile phone, the frequency of the backward signal which a radio pager uses to transmit its response signal is set uniquely in relation to the frequency of the forward signal used to transmit the paging signal. Namely, $F_b$ is assumed to be set uniquely in relation to $F_f$. Now, in a radio paging system a single forward signal frequency is used in all the radio zones. Therefore when a plurality of paging signals are transmitted in the forward signal, in all the radio zones a plurality of radio pagers will respond simultaneously using the same backward signal frequency. To avoid collision of such response signals and to improve the transmission quality of the backward signal, at least those radio pagers which have been paged simultaneously must send back their response signals at different times. For example, the backward signal is divided into a plurality of slots, each slot is allocated to one of the radio pagers which have been paged simultaneously, and the response signal from each radio pager is inserted in its allocated slot.

FIG. 5 and FIG. 6 are block diagrams showing two examples of the configuration of a central station. FIG. 5 shows an example of the configuration of central station 103 used in the one-way radio paging system illustrated in FIG. 1, while FIG. 6 shows an example of the configuration of central station 111 used in the two-way radio paging system illustrated in FIG. 3.

Central station 103 used in the one-way radio paging system comprises paging switch 121, encoding unit 123, distributor 124, and a plurality of line terminators 126. Paging switch 121 is connected to the telephone network and outputs paging request signals from this telephone network to encoding unit 123. Encoding unit 123 converts these paging request signals to a paging signal sequence. Distributor 124 distributes this paging; signal sequence to each base station. Line terminators 126 each terminate a line to a base station and transmit the paging signal sequence from distributor 124 to a base station.

As opposed to this, central station 111 used in the two-way radio paging system comprises paging switch 122, encoding unit 123, distributor and concentrator 125, and a plurality of line terminators 127. Paging switch 122 is capable of two-way operation, while encoding unit 123 is on a par with the encoding unit of central station 103 shown in FIG. 5. Distributor and concentrator 125 distributes the paging signal sequence output by encoding unit 123 to each base station and also concentrates the response signals received by line terminators 127 and sends back the response information to the paging request sources via paging switch 122. Line terminators 127 terminate the lines to the respective base stations, transmit the paging signal sequences from distributor and concentrator 125 to the base stations, receive response signals coming from the radio pagers via the base stations, and input these response signals to distributor and concentrator 125.

If a backward signal is divided into a plurality of slots for allocation to the radio pagers, an increase in the number of radio pagers transmitting response signals will necessitate an increase in the number of slots. Moreover, an increase in the length of the response signal from each radio pager will necessitate an increase in the number of bits comprising a slot. In either case, this will require an increase in the transmission rate and capacity of the backward signal.

However, a higher backward signal transmission rate means that the received power required at a base station becomes larger and the output power of a radio pager has to be increased. This results in increased power consumption at a radio pager and shortened battery life.

Although varying the backward signal frequency for each radio pager could be considered, this would result in poor frequency utilization and in complicated control of radio pagers.

It is an object of the present invention to provide a radio paging system which overcomes this sort of problem and which, even when the number of radio pagers is increased, is capable of transmitting a response signal from each radio pager at a low power level and of making effective utilization of frequency.

DISCLOSURE OF THE INVENTION

A first aspect of the present invention is a radio paging system which may be characterized as follows. Namely, in a radio paging system having a plurality of base: stations which convert to radio signals and transmit a paging signal sequence, and a radio pager which receives at least part of this paging signal sequence transmitted from the plurality of base stations, wherein the radio pager comprises response transmitting means for sending back a response signal when a signal addressed to itself is contained in the received signal, and a base station comprises response receiving means for receiving this response signal: each of the plurality of base stations comprises means for inserting a base station ID signal, which differs for each base station, into the paging signal sequence to be transmitted; the response transmitting means comprises means for direct sequence modulating the response signal in accordance with a code obtained from the base station ID signal which has been inserted in the received paging signal sequence; and the response receiving means comprises means for receiving the direct sequence modulated response signal from a radio pager.

A code uniquely obtained from the base station ID signal alone can be used as the code for the direct sequence modulation (hereinafter termed the "spreading code"), but it is also possible to use a code uniquely obtained from the base station ID signal and the radio pager address, so that the receiver can be identified as well. Namely, the direct sequence modulating means can comprise means for obtaining the spreading code from the base station ID signal inserted in the paging signal sequence and from the address of the radio pager to which it belongs, and the receiving means can comprise means which obtains the spreading code required to receive the response signal, from the base station ID signal transmitted by the base station to which it belongs, and from the address of the paged radio pager.

In some circumstances, for example when a radio pager has moved between base station radio zones, it may be impossible to receive a response signal at the base station which originally transmitted the paging signal received by the radio pager. Under such circumstances, in order to be able to receive the response signal at another base station and in particular at an adjacent base station, it is preferable for the receiving means to comprise storage means in which are pre-registered the base station ID signals transmitted from other base stations, and means for receiving, in addition to response signals to the base station ID signal transmitted from its own base station, response signals to the base station ID signals transmitted from other base stations.

A second aspect of the present invention is a radio pager which is used by such a radio paging system, and which may be characterized as follows. Namely, in a radio pager having means for receiving a paging signal sequence and for detecting a paging signal addressed to itself, and means for transmitting a response signal to a paging signal addressed to itself, and wherein in the paging signal sequence there is inserted the base station ID signal of the base station which is the source of the transmission: the means for transmitting the response signal comprises means for direct sequence modulating the response signal in accordance with a code obtained from the received base station ID signal. This direct sequence modulating means can comprise means for obtaining the spreading code from the received base station ID signal and from the address of the radio pager to which it belongs.

It is also possible to perform direct sequence modulation of the response signal using a code uniquely determined by the transmission position of the paging signal within the paging signal sequence. This serves the purpose of enabling spreading codes to be allocated in such manner that different pagers do not get the same code, and of ensuring that these spreading codes can be found easily at the base station side as well.

That is to say, a third aspect of the present invention provides a radio paging system which may be characterized as follows. Namely, in a radio paging system having a plurality of base stations which convert to radio signals and transmit a paging signal sequence, and a radio pager which receives at least some of the paging signals of this paging signal sequence transmitted from the plurality of base stations, wherein the radio pager comprises response transmitting means for sending back a response signal when a paging signal addressed to itself is contained among the received paging signals, and a base station comprises response receiving means for receiving this response signal:

the response transmitting means comprises means for direct sequence modulating the aforementioned response signal using a code obtained in accordance with the position of the paging signal addressed to its own radio pager in the transmitted paging signal sequence; and the response receiving means comprises means for receiving the direct sequence modulated response signal from the aforementioned radio pager using a code obtained in accordance with the position of the individual paging signal in the transmitted paging signal sequence.

The response transmitting means can comprise means for obtaining the code for the direct sequence modulation in accordance with what number of paging signal a paging signal addressed to its own radio pager is, starting from a predetermined point in time, and the response receiving means can comprise means for obtaining the code for receiving the response signal in accordance with the order of the transmitted paging signals, starting from a predetermined point in time.

It is preferable for the paging signal sequence to be a signal whereof the unit is a frame sequence comprising a plurality m of frames of predetermined signal length joined together; for each frame to comprise a plurality of paging signals; for a radio pager to be set to receive at least some pre-allocated frames within each frame sequence; and for the response transmitting means and the response receiving means each to comprise means for obtaining the code for the direct sequence modulation in accordance with the position of a paging signal within a frame (what number of paging signal that paging signal is within the frame), or in accordance with the position of that paging signal within the frame and the position of that frame within the frame sequence (what number of frame it is), or in accordance with the position of the paging signal within the frame, the position of that frame within the frame sequence, and the time at which that frame or frame sequence was transmitted. If the code is obtained in accordance with the position of the paging signal within a frame, it can be obtained in accordance with the position in each frame, or it can be obtained from the order of the paging signals in the frames with the same frame position in the frame sequences after a predetermined point in time.

A fourth aspect of the present invention provides a radio pager characterized in that comprises means for direct sequence modulating a response signal in accordance with a code obtained in accordance with the position of the paging signal addressed to the radio pager in question within the paging signal sequence transmitted from the base station.

BRIEF DESCRIPTION THE DRAWINGS

Figure 12:
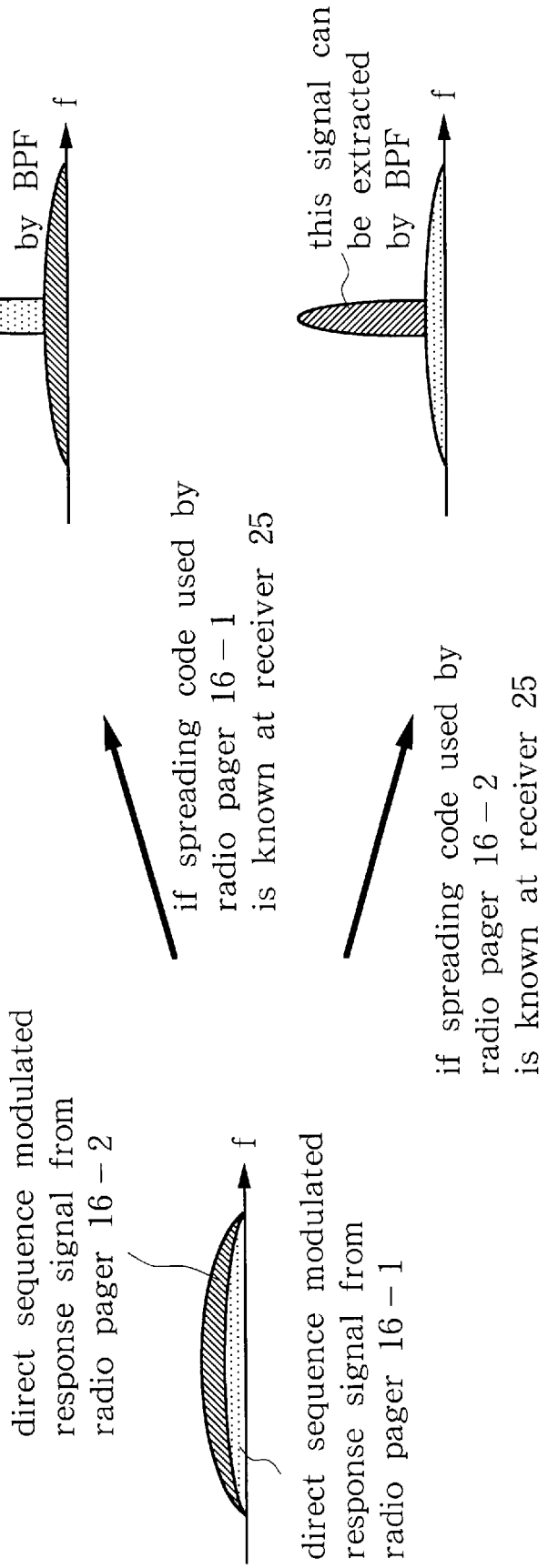

FIG. 12 serves to explain the operation of receiving when signals which have been direct sequence modulated using different codes have collided.

Figure 13:
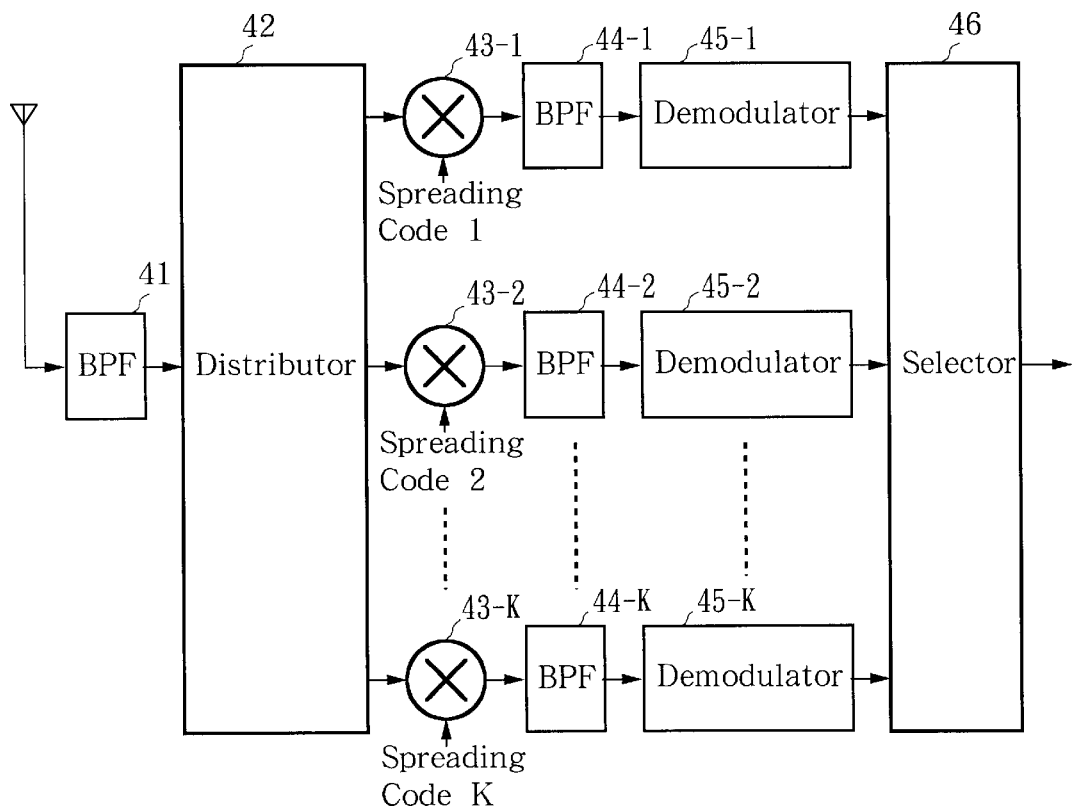

FIG. 13 shows an example of the configuration of a receiver for receiving in parallel a plurality of direct sequence modulated signals.

Figure 14:
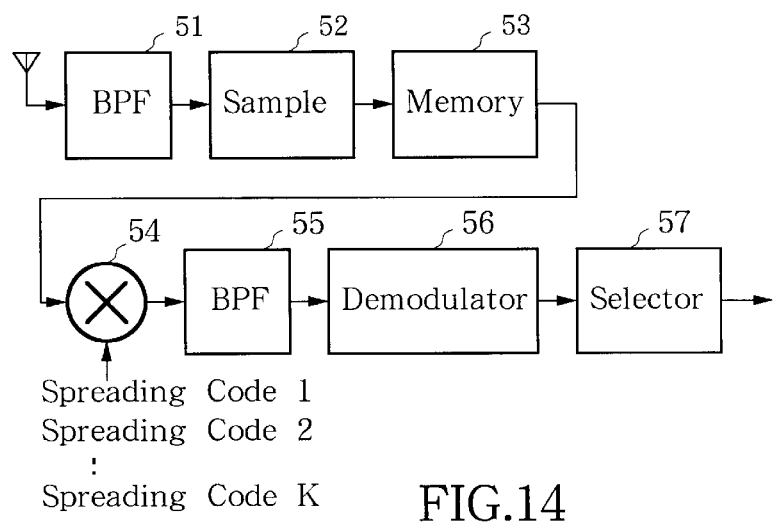

FIG. 14 shows an example of the configuration of a receiver which receives a plurality of direct sequence modulated signals simultaneously, stores them, and then processes them one by one.

Figure 15:
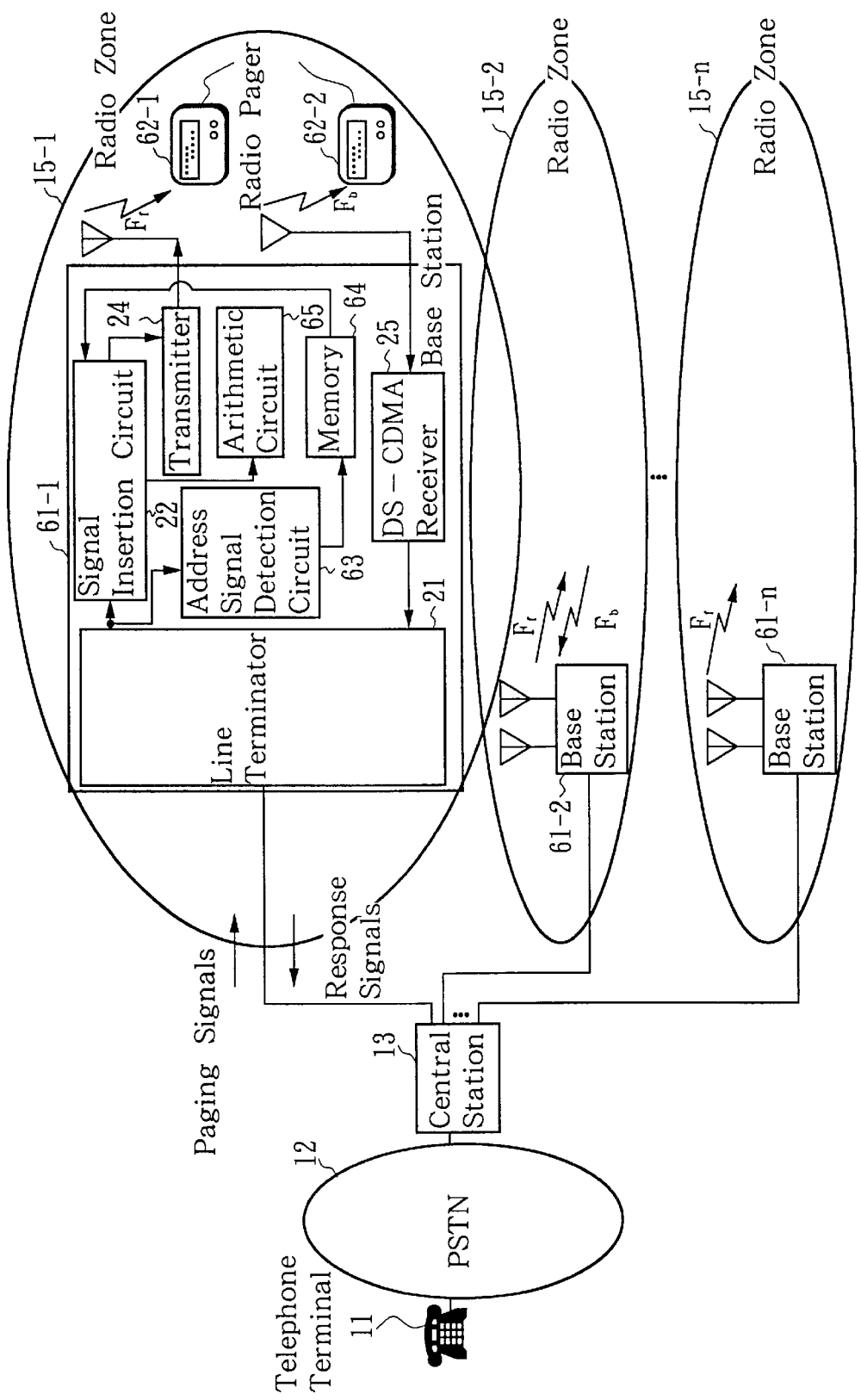

FIG. 15 is a block diagram showing a radio paging system according to a second embodiment of the present invention.

Figure 16:
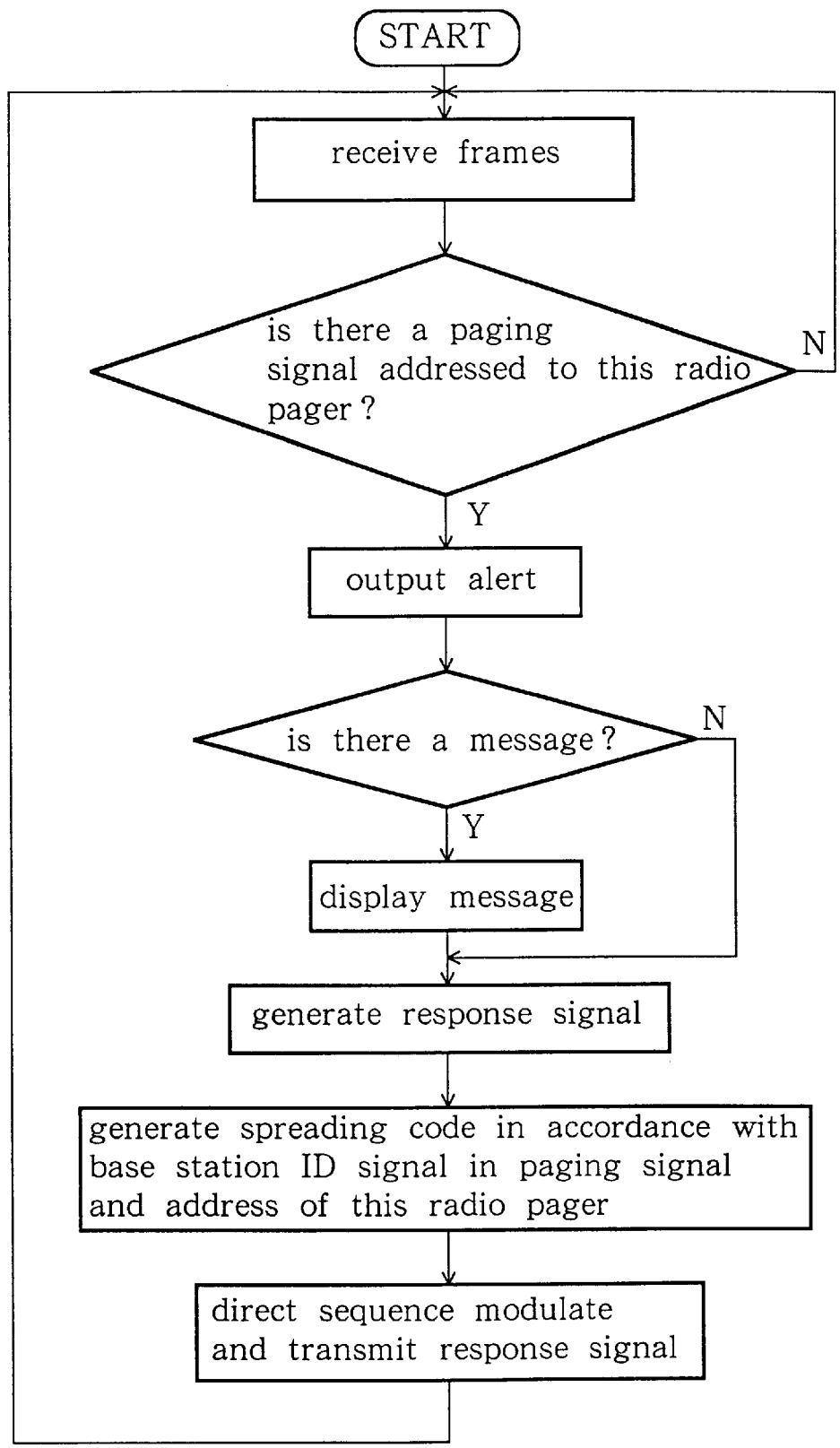

FIG. 16 shows an example of the operating flow of a radio pager.

Figure 17:
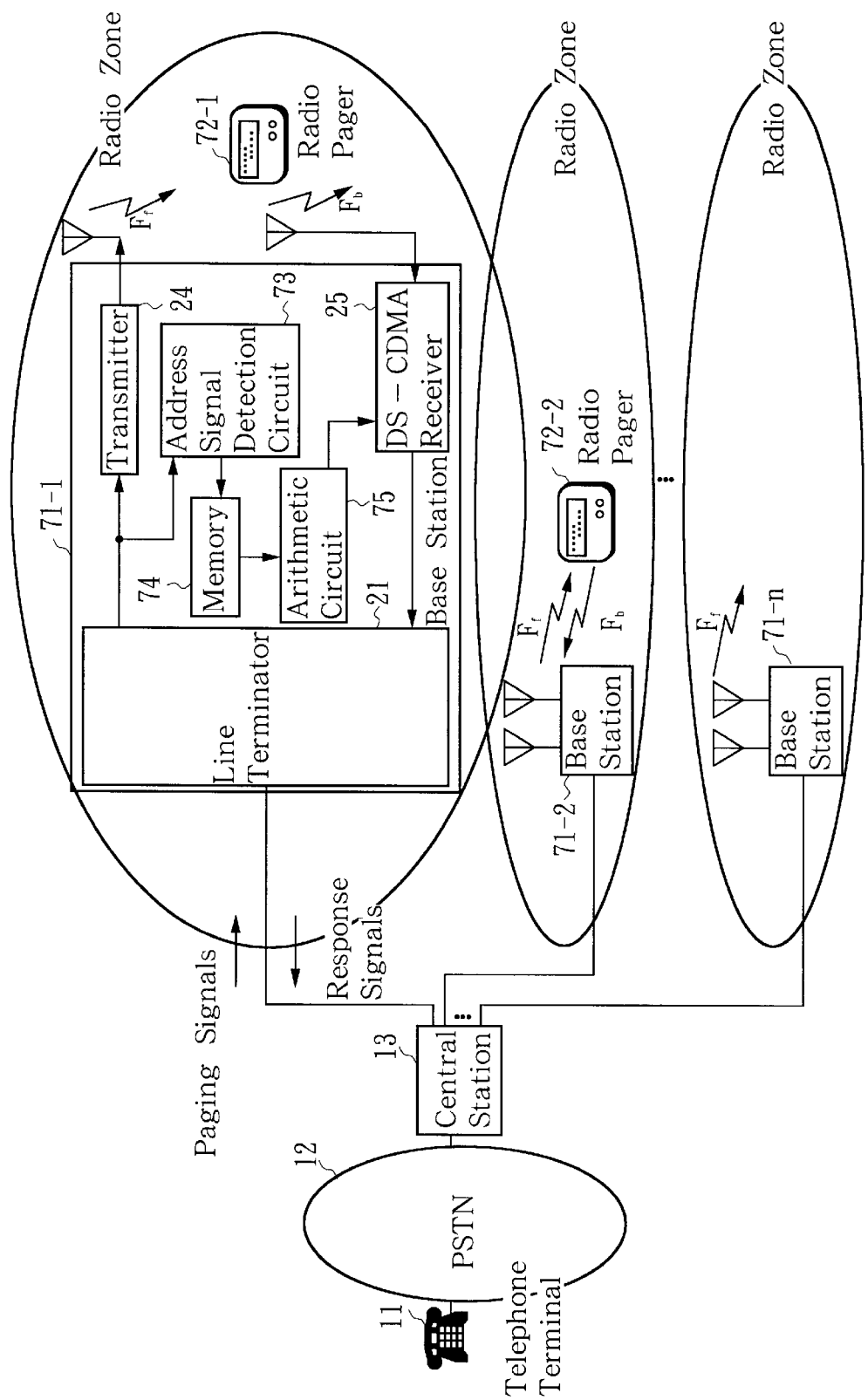

FIG. 17 is a block diagram showing a radio paging system according to a third embodiment of the present invention.

Figure 18:
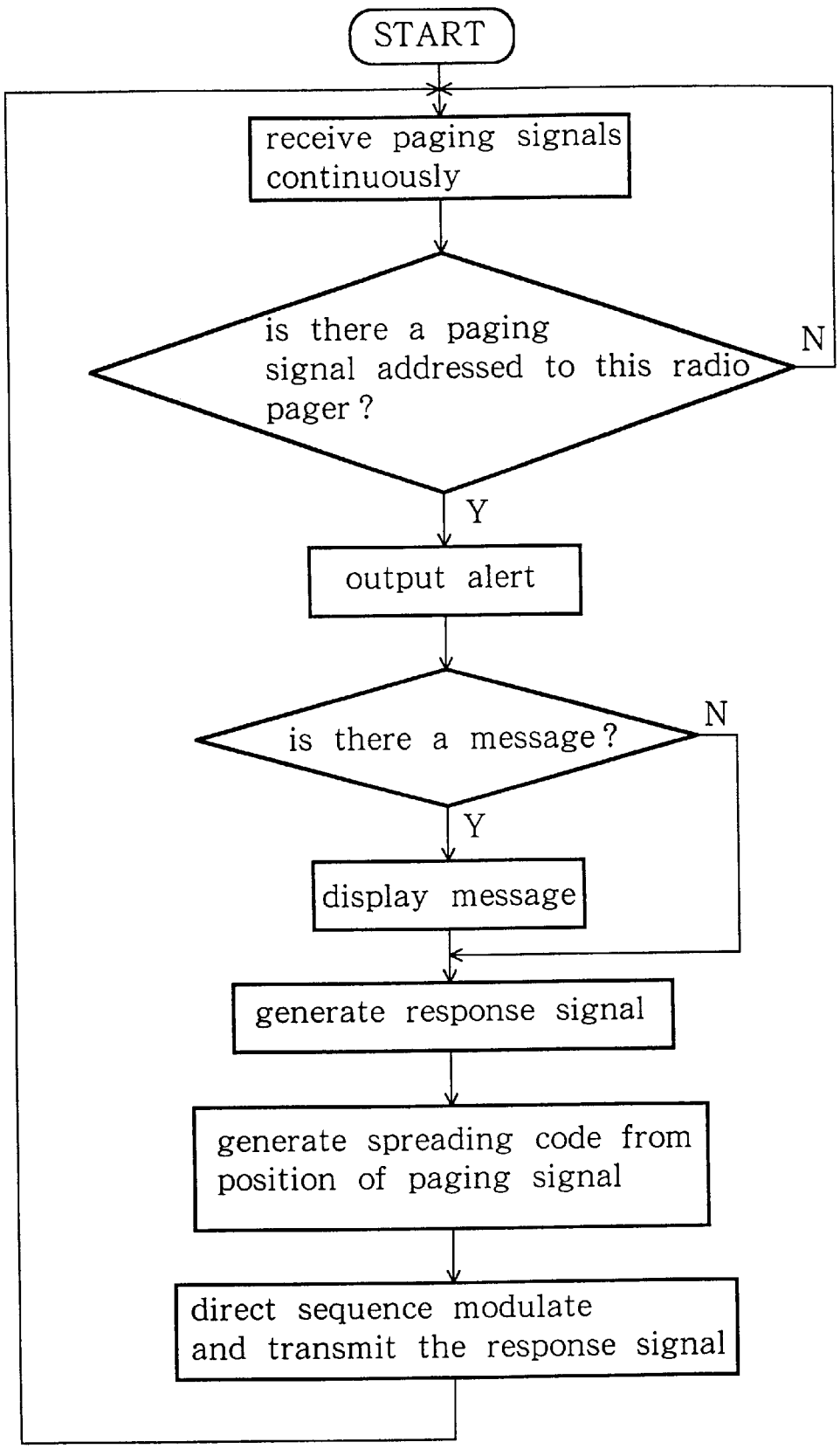

FIG. 18 shows an example of the operating flow of a radio pager.

Figure 19:
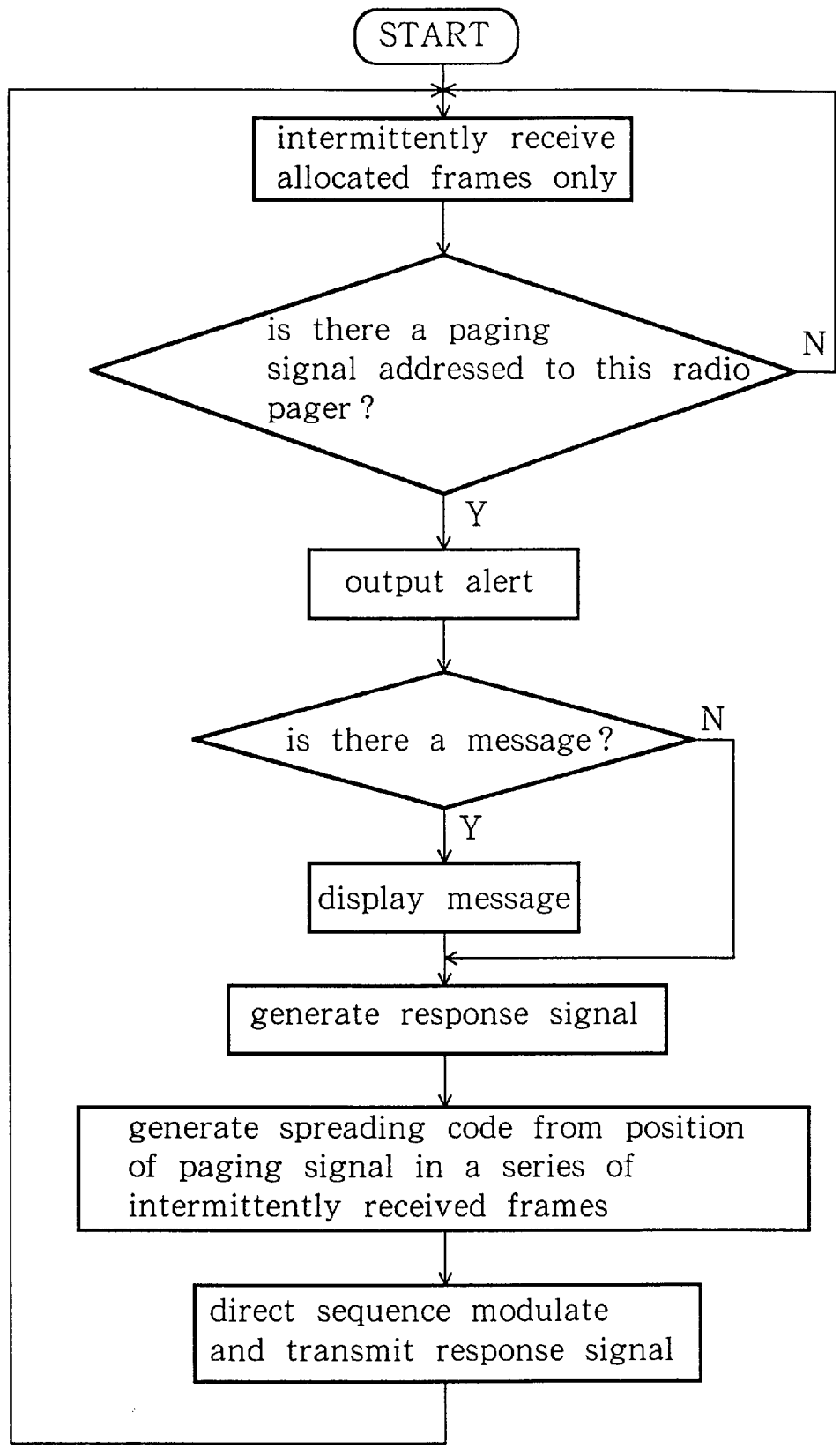

FIG. 19 shows another example of the operating flow of a radio pager.

Figure 20:
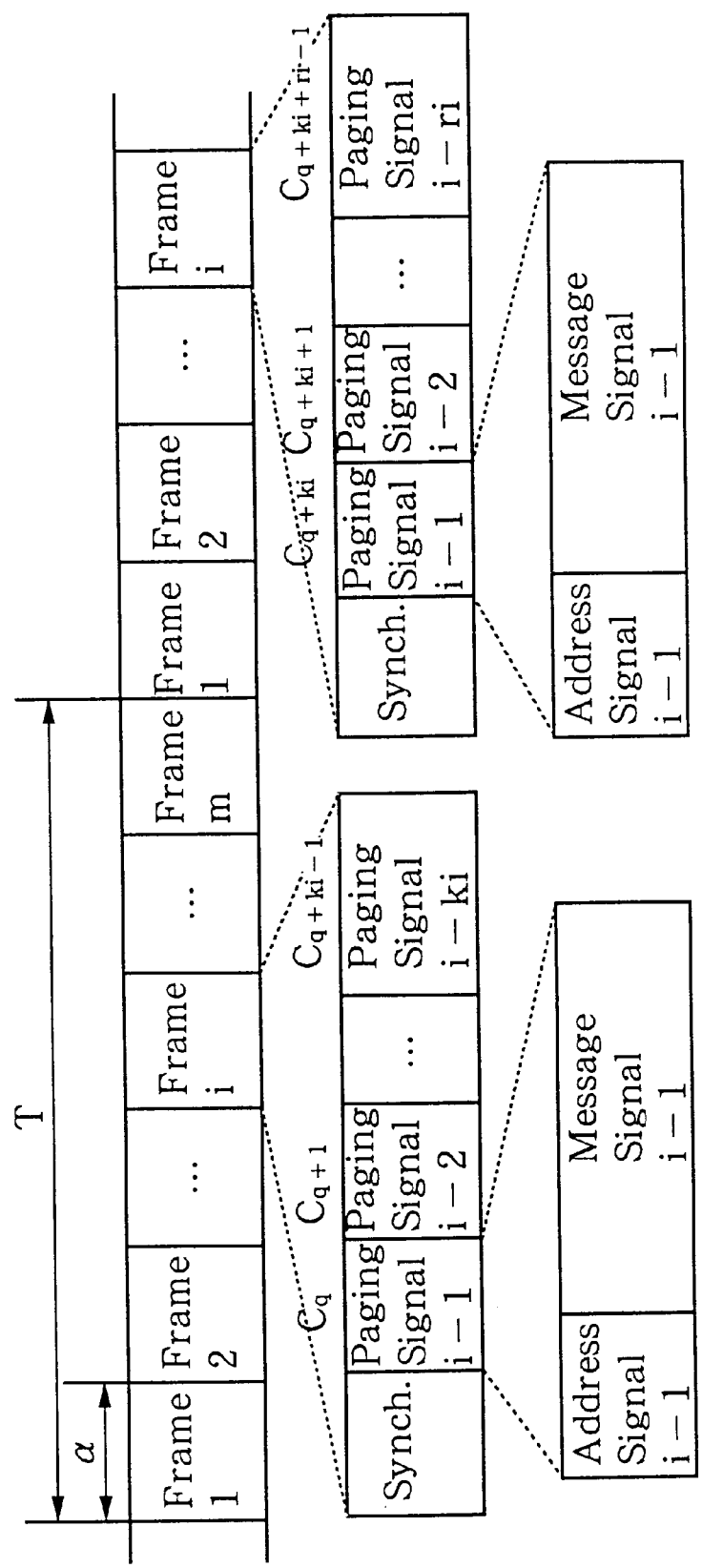
Figure 21:
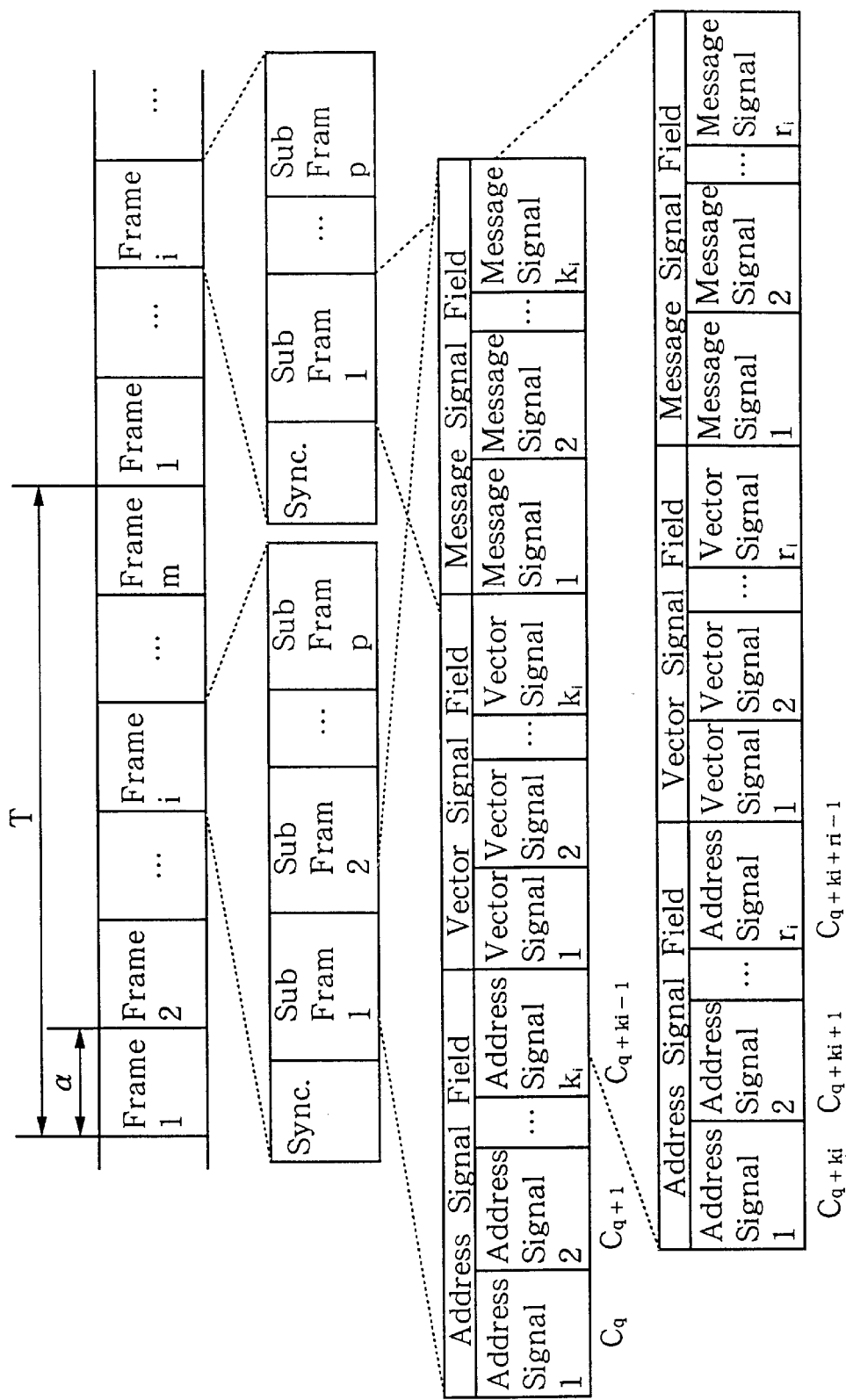

FIG. 20 and FIG. 21 show examples of the allocation of spreading codes.

Figure 22:
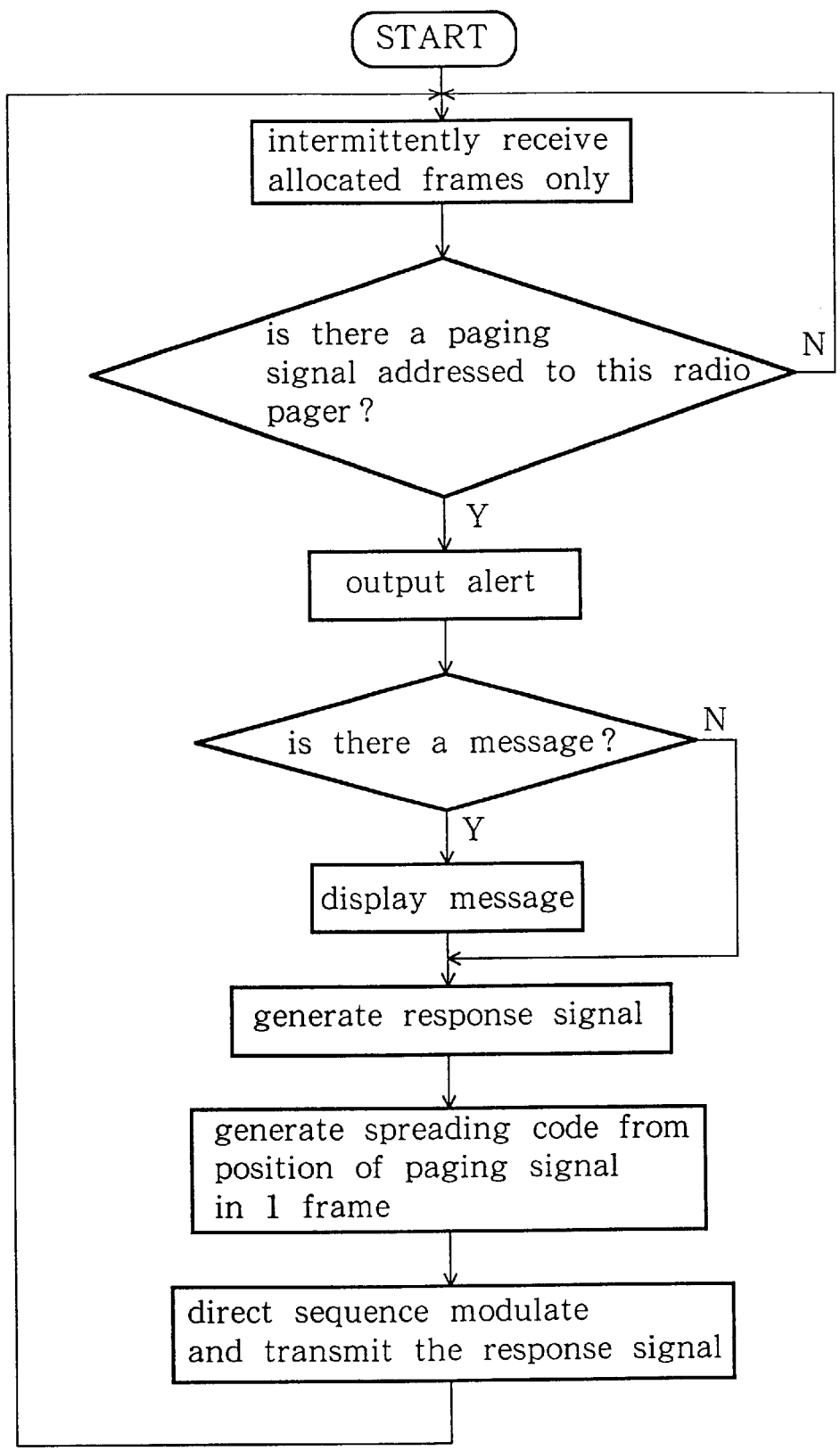

FIG. 22 shows another example of the operating flow of a radio pager.

Figure 23:
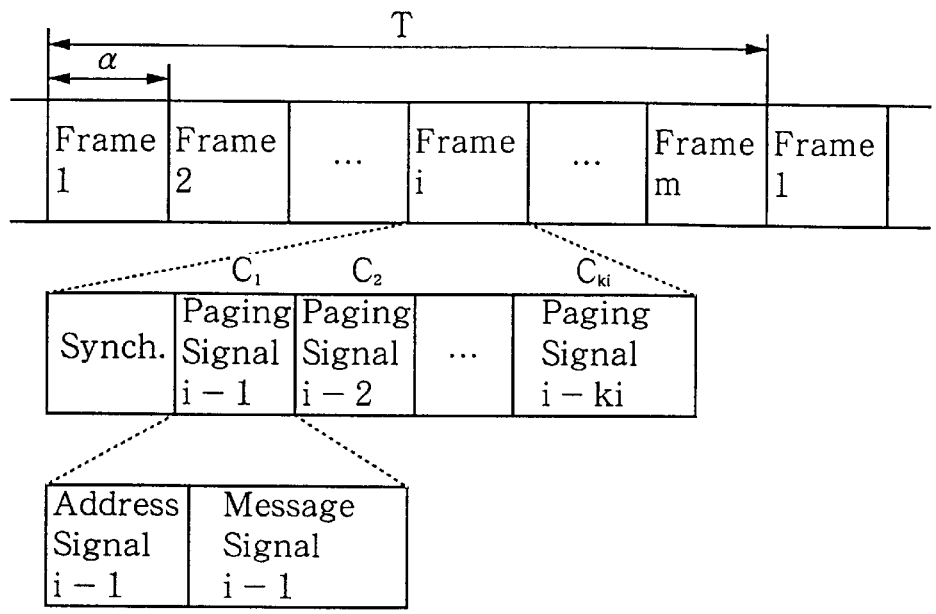
Figure 24:
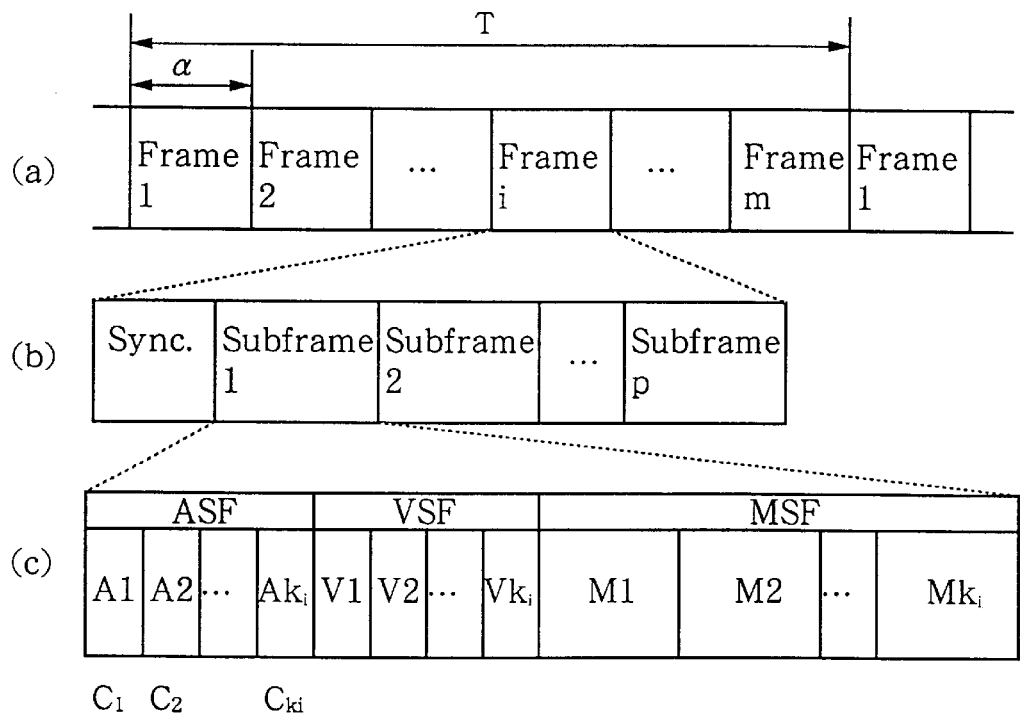

FIG. 23 and FIG. 24 show examples of the allocation of spreading codes.

Figure 25:
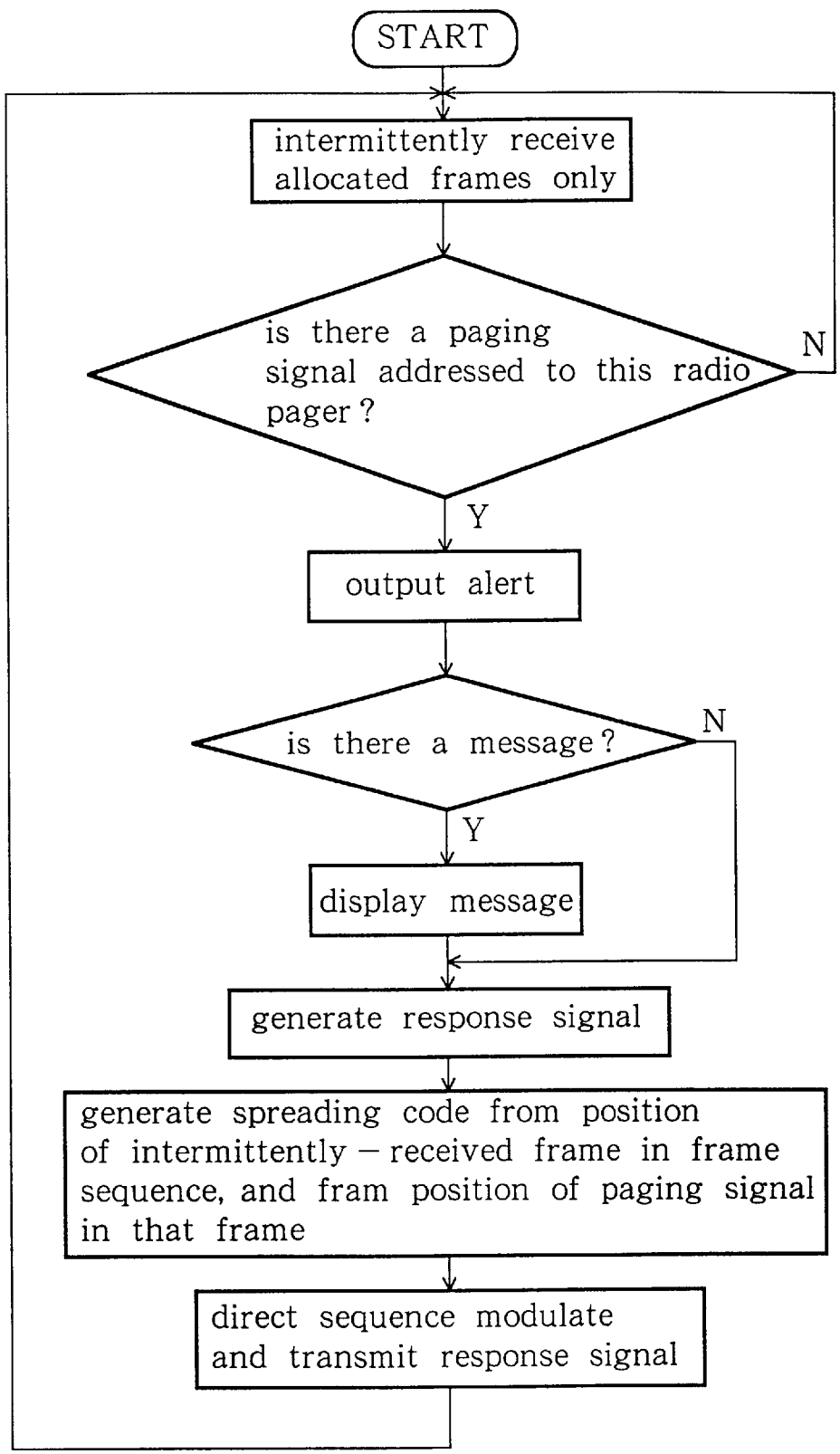

FIG. 25 shows another example of the operating flow of a radio pager.

FIG. 26 and FIG. 27 show examples of the allocation of spreading codes.

Figure 28:
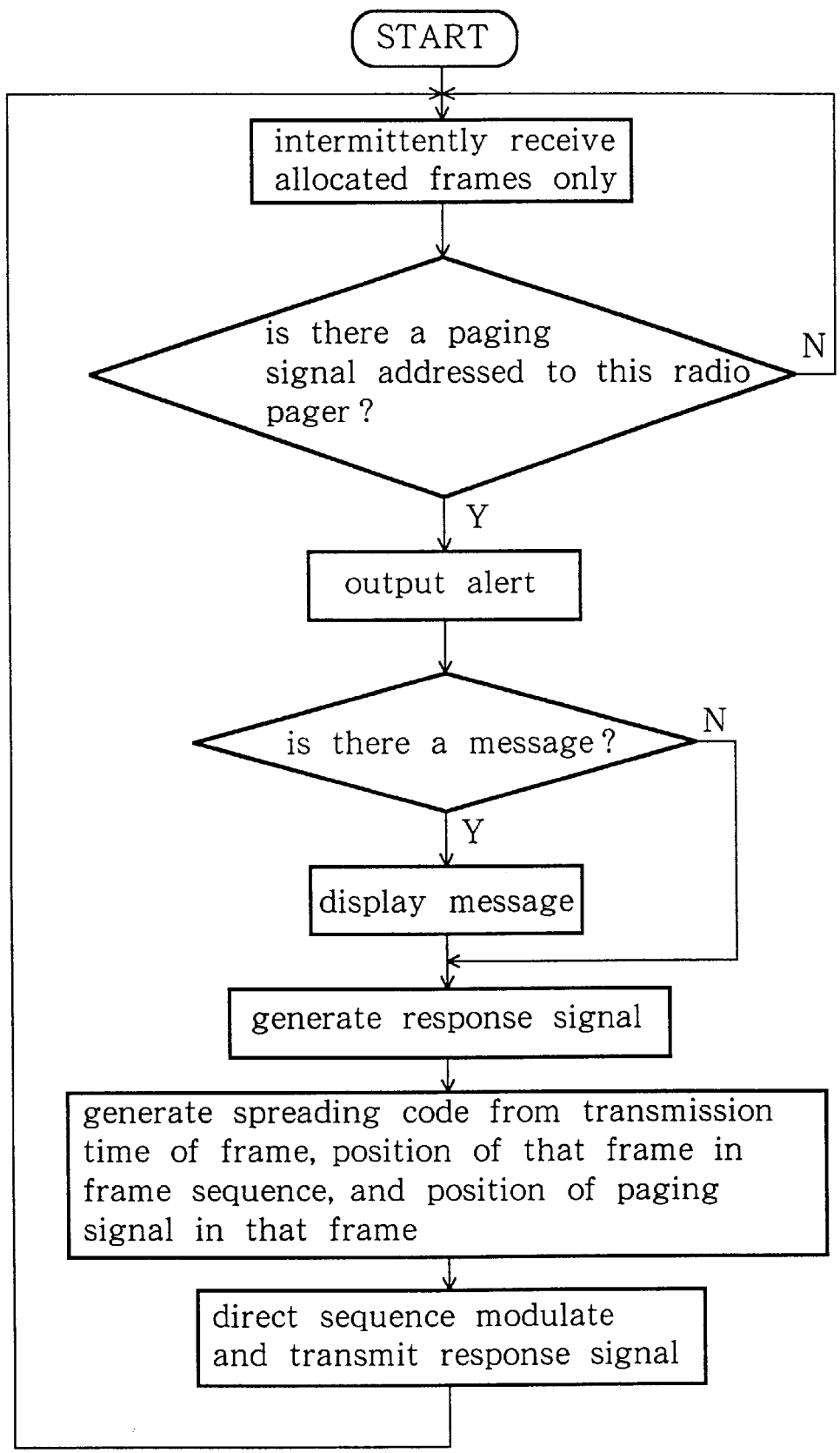

FIG. 28 shows another example of the operating flow of a radio pager.

Figure 29:
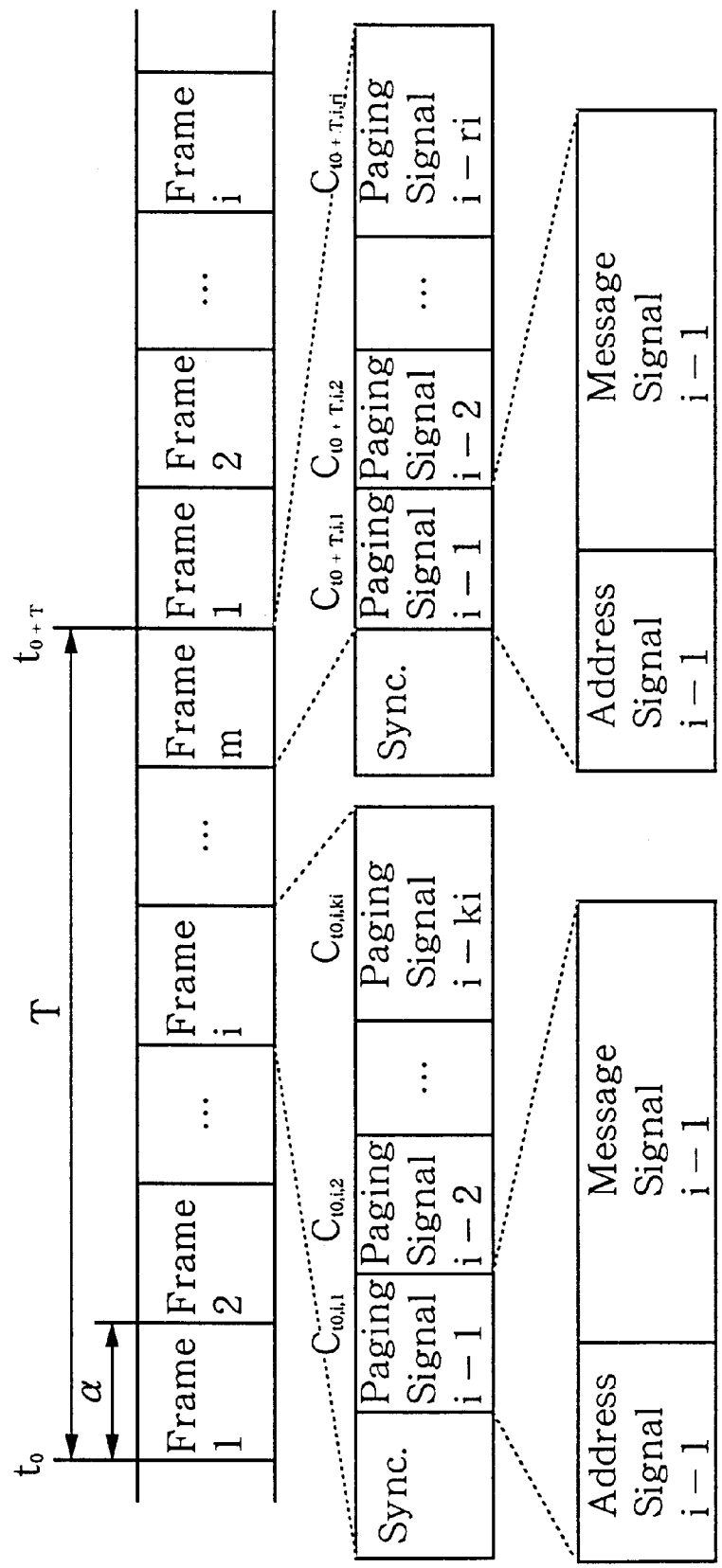
Figure 30:
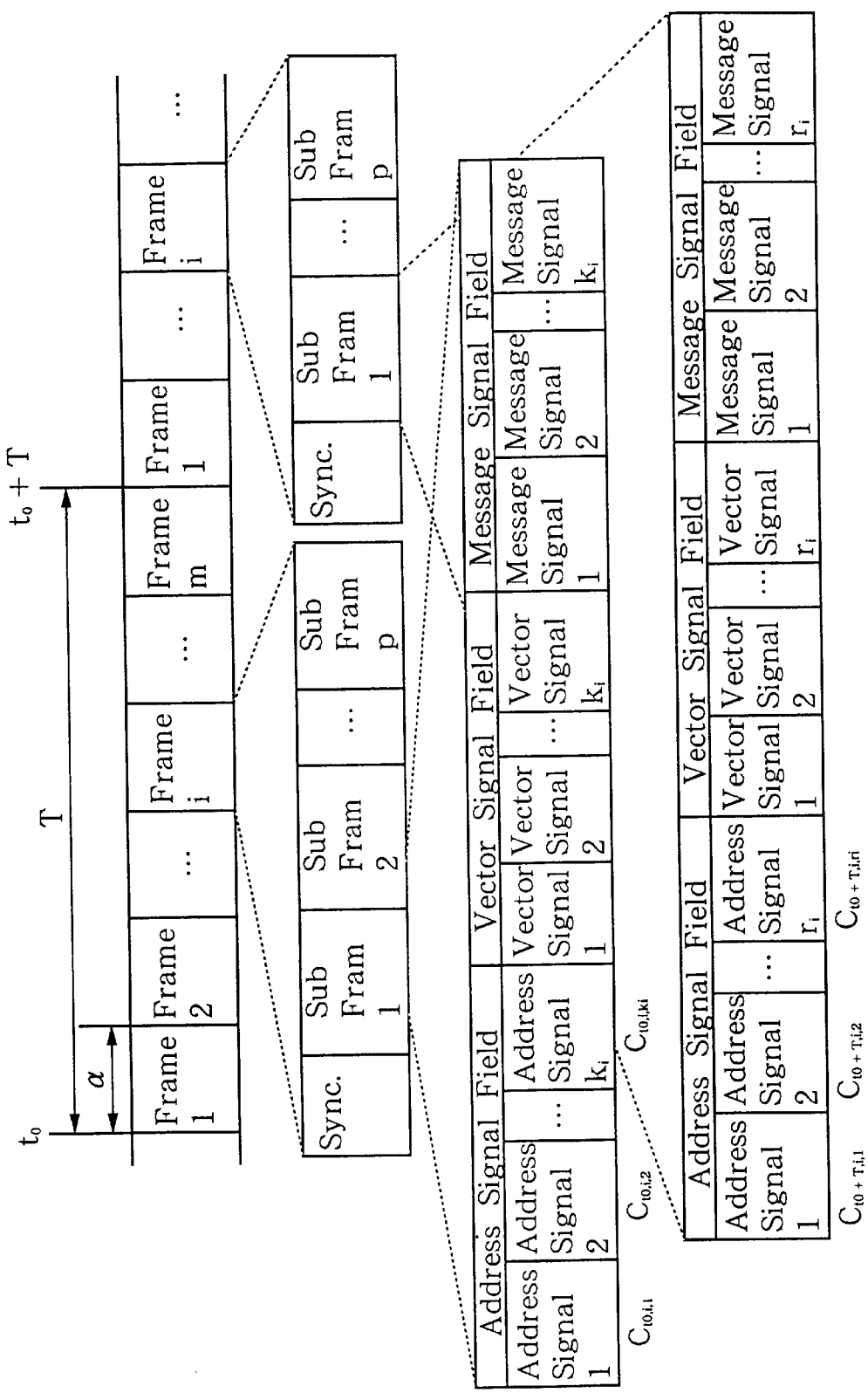

FIG. 29 and FIG. 30 show examples of the allocation of spreading codes.

BEST MODE FOR CARRYING OUT THE INVENTION

Figure 7:
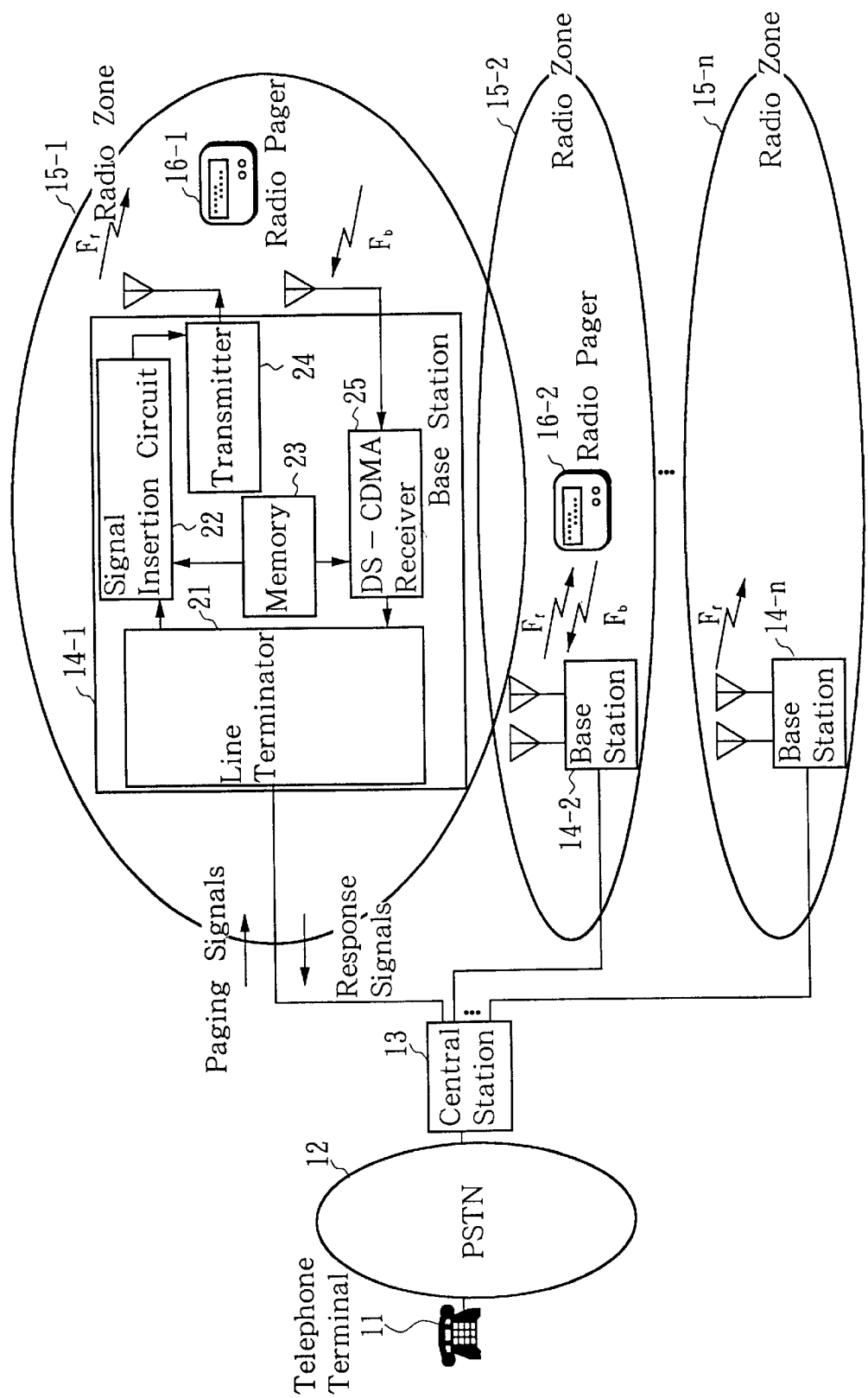
FIG. 7 is a block diagram showing a radio paging system according to a first embodiment of the present invention.

FIG. 7 is a block diagram showing a radio paging system according to a first embodiment of the present invention. In order to page a radio pager (here, two radio pagers 16-1 and 16-2 are shown) from telephone terminal 11 via telephone network 12, this radio paging system comprises a plurality of base stations 14-1 to 14-n which convert to radio signals and transmit a paging signal sequence which has been received from telephone network 12 via central station 13, and radio pagers 16-1 and 16-2 which receive at least part of the paging signal sequence transmitted from this plurality of base stations 14-1 to 14-n to respective radio zones 15-1 to 15-n. Base stations 14-1 to 14-n each comprise line terminator 21 which terminates the line to central station 13, signal insertion circuit 22 which inserts into the paging signal sequence to be transmitted a base station ID signal which differs for each base station, memory 23 which stores this base station ID signal, transmitter 24 for transmitting the paging signal sequence into which the base station ID signal has been inserted, and direct sequence modulated signal receiver 25 which receives a direct sequence modulated signal using a code which is uniquely determined from this base station ID signal (in FIG. 7 these details are shown for base station 14-1 only).

To page radio pagers 16-1 and 16-2 from telephone terminal 11, the number of radio pager 16-1 or 16-2, and the message if there is one, are input from telephone terminal 11. This information is then input to central station 13 via public switched telephone network, 12 as a paging request signal. At central station 13 this paging request signal is converted to a paging signal sequence and transmitted to a plurality (herein denoted by n) of base stations 14-1 to 14-n. Base stations 14-1 to 14-n receive this paging signal sequence using line terminators 21, insert their respective base station ID signals by means of signal insertion circuits 22, convert the paging signal sequence to radio signals (radio waves) in transmitters 24, and transmit these radio signals at the same frequency $F_f$ to radio zone 15-1 to 15-n of each respective base station. The base station ID of each base station is stored in advance in memory 23, and signal insertion circuit 22 reads the content of this memory and inserts it into the paging signal sequence.

Figure 8:
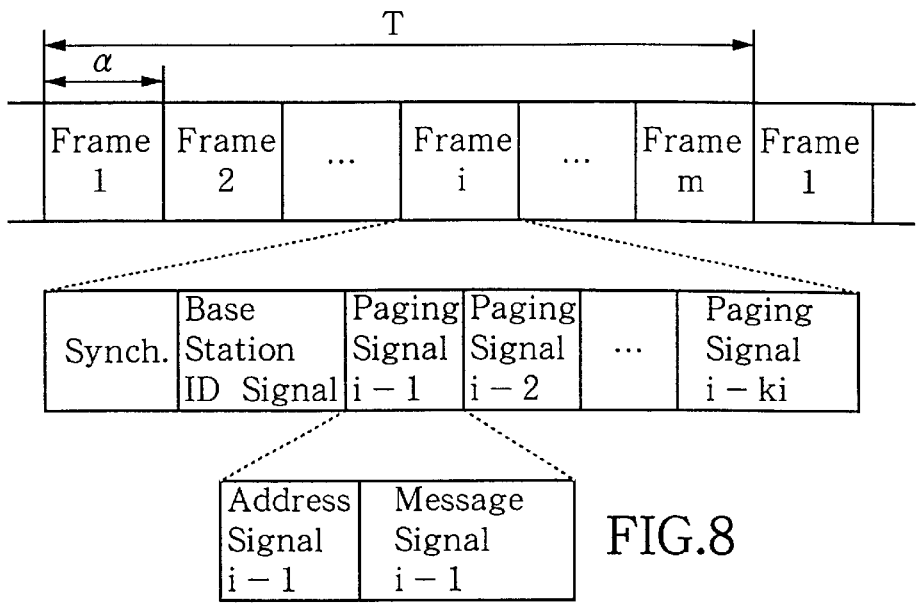
FIG. 8 shows an example of the configuration of a paging signal which a radio pager receives in the first embodiment.
Figure 9:
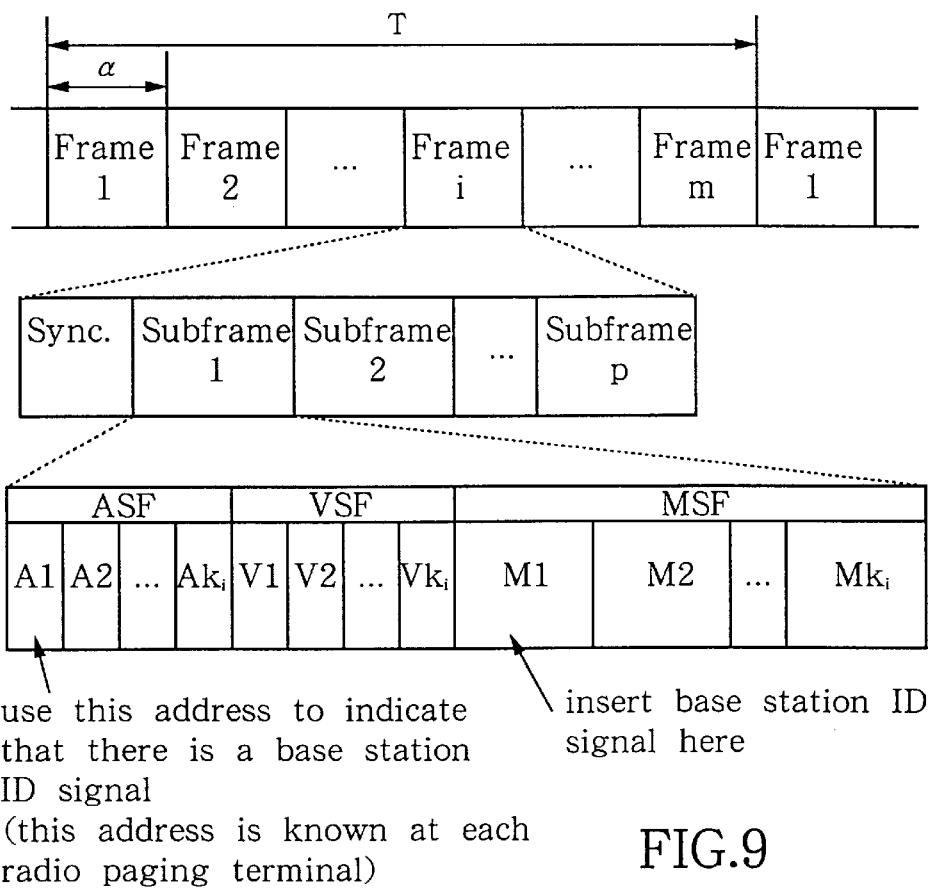
FIG. 9 shows another example of the configuration of a paging signal.

FIG. 8 and FIG. 9 show examples of the configuration of a paging signal which a radio pager receives.

In the example configuration shown in FIG. 8, the paging signal sequence comprises a frame sequence of period T comprising m frames of signal length a joined together. The i-th frame comprises a synchronization signal, a base station ID signal, and $k_i$ paging signals. In this example it is assumed that the base station ID signal is inserted after the synchronization signal. Each paging signal comprises an address signal and a message signal.

The example configuration shown in FIG. 9 is based on standard RCR STD-43 established by the Research and Development Center for Radio Systems, and here the paging signal sequence comprises a frame sequence of period T comprising m frames of signal length α joined together, wherein the i-th frame comprises a synchronization signal and p subframes which serve to repeat the same paging signals (where p is equal to the number of times the same paging signals are transmitted). Each subframe comprises an address signal field comprising $k_i$ address signals, a vector signal field comprising vector signals corresponding to these address signals, and a message signal field comprising message signals corresponding to these address signals. Each individual paging signal comprises one address signal, one vector signal corresponding to this, and one message signal corresponding to these. A vector signal is a signal which links together an address signal and a message signal, and vector signal i indicates the starting point and finishing point of message signal i corresponding to address signal i (where i ranges from 1 to $k_i$). To transmit and receive a base station ID signal using a signal configuration of this sort, one address signal (in FIG. 9, address signal 1) is used for an address which serves to indicate that there is a base station ID signal, and the base station ID signal is given in the message signal corresponding to this address signal (in FIG. 9, message signal 1). The address which serves to indicate that there is a base station ID signal is assumed to be known at each radio pager.

Figure 4:
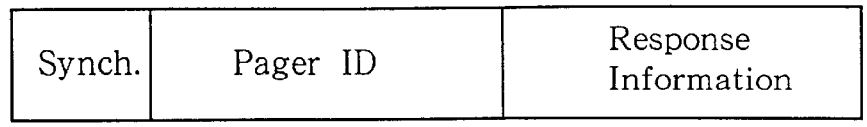
FIG. 4 shows an example of the configuration of a response signal which a radio pager transmits in a conventional two-way radio paging system.
Figure 5:
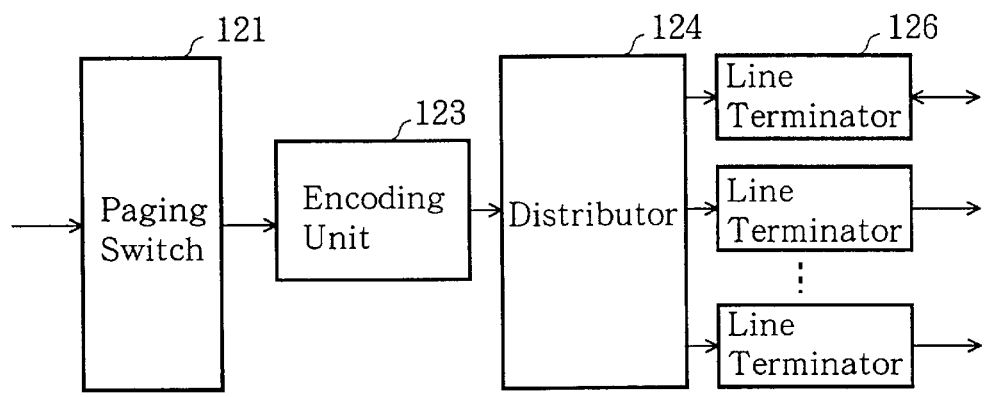
FIG. 5 is a block diagram showing the central station used in a conventional one-way radio paging system.
Figure 6:
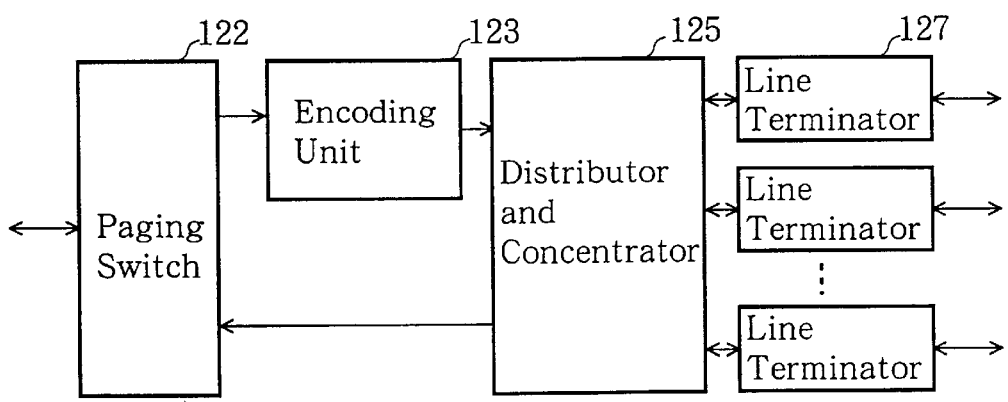
FIG. 6 is a block diagram showing the central station used in a conventional two-way radio paging system.

Whichever signal configuration is used, the receive function of radio pagers 16-1 and 16-2 is activated only during the receiving period of one or more pre-allocated frames of the m frames, whereupon the radio pager receives the frame or frames in question. When a radio pager has detected a paging signal addressed to itself, it notifies the user that he or she has been paged, and also sends back a response signal with the format shown in FIG. 4 after direct sequence modulating said response signal using as the spreading code a code uniquely determined from the base station ID signal which had been inserted in the received paging signal sequence.

At base stations 14-1 to 14-n, the response signal from a radio pager is received by direct sequence modulated signal receiver 25. Here, the direct sequence modulated wave is received using as the spreading code a code determined in accordance with the base station ID signal stored in memory 23, namely, the same code as used by the radio pager. Frequency $F_b$ of the response signal is assumed to be uniquely determined by the transmitted frequency $F_f$. The received response signal is transmitted to central station 13 via a line terminator 21 and then reported to telephone terminal 11 on the paging side via telephone network 12.

Figure 10:
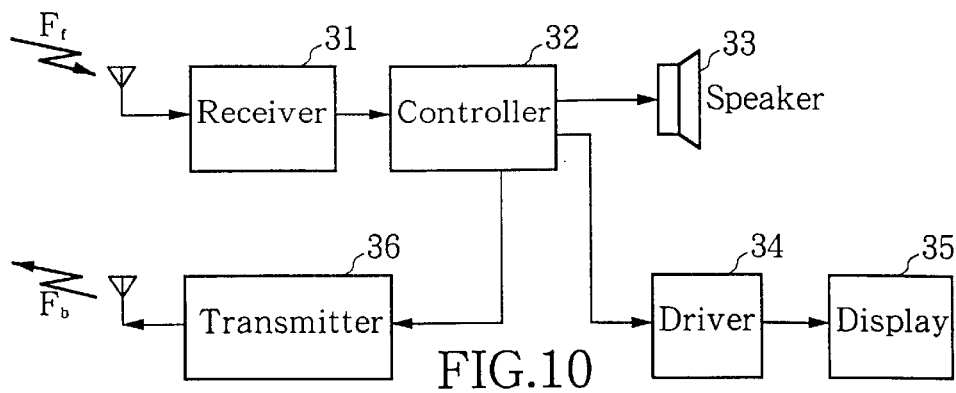
FIG. 10 shows an example of the configuration of a response signal which a radio pager transmits.
Figure 11:
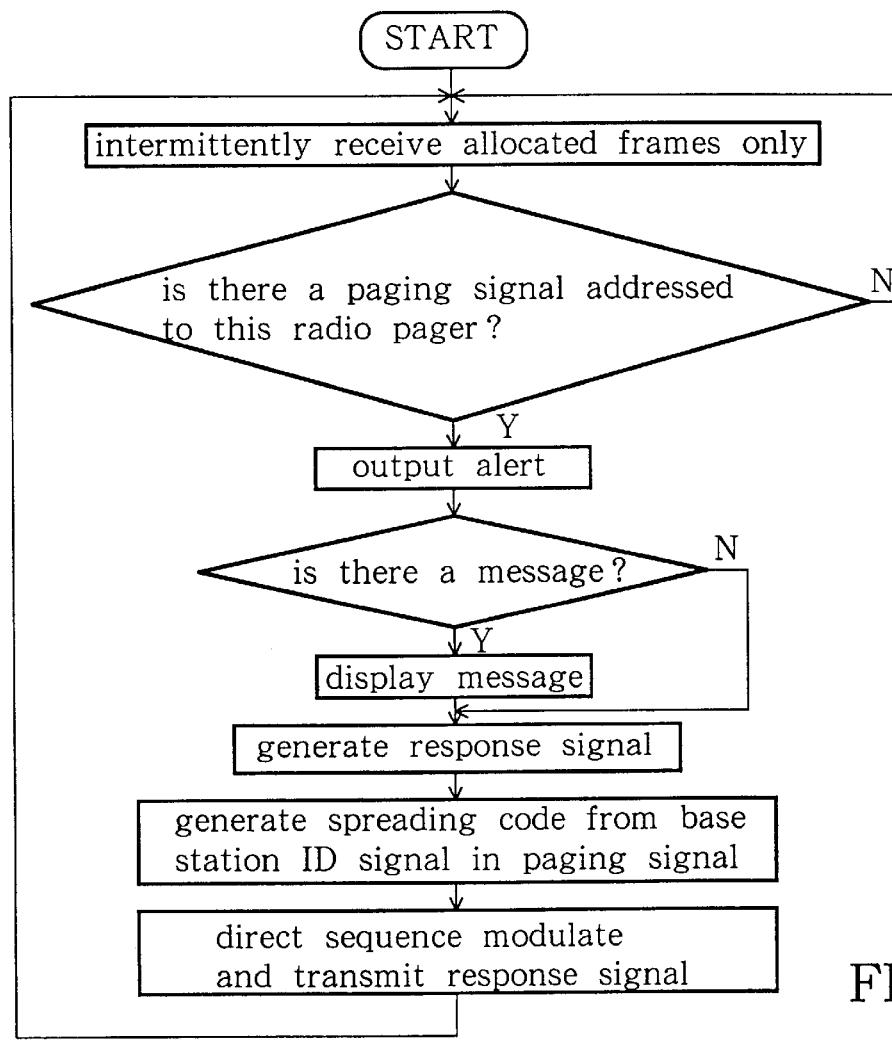
FIG. 11 shows an example of the operating flow of a radio pager.

FIG. 10 is a block diagram showing an example of a radio pager, and FIG. 11 shows its operating flow. Although the fundamental configuration and operation of this radio pager are on a par with those of a radio pager in a conventional two-way radio paging system, the portions relating to transmission of the response signal are different.

Namely, this radio pager comprises receiver 31, controller 32, speaker 33, driver 34, display 35 and transmitter 36. Receiver 31 intermittently receives part of the paging signal sequence transmitted from a base station. Controller 32 detects, in the paging signal sequence received by receiver 31, the base station ID signal received after the synchronization signal, or the base station ID signal communicated to each radio pager using a common message signal, and thereby recognizes the base station which has transmitted this signal. Controller 32 also checks whether or not there is a paging signal addressed to the radio pager to which it belongs in the received paging signal sequence. If a paging signal addressed to this radio pager is detected, controller 32 outputs an audible tone or other alert from speaker 33, thereby notifying the user that he or she has been paged. When a message has been added to this paging signal, controller 32 also displays this message, via driver 34, on display 35. In addition, when controller 32 has detected a paging; signal addressed to the radio pager to which it belongs, it outputs a response signal to transmitter 36 and also outputs to transmitter 36, as a spreading code, a code uniquely determined in accordance with the previously detected base station ID signal. Transmitter 36 uses the spreading code input from controller 32 to direct sequence modulate the response signal which has likewise been input from controller 32, and transmits the direct sequence modulated signal to a base station.

Now, if paging signals have been transmitted simultaneously to two radio pagers which receive the same forward signal frequency $F_f$, the result is that a response signal will be transmitted from each radio pager using the same backward signal frequency $F_b$. However, if these pagers are in mutually different radio zones as shown in FIG. 7, the two response signals will be received without collision. On the other hand, if the response signal from radio pager 16-2 in FIG. 7 has reached base station 14-1 from adjacent radio zone 15-2, or if radio pager 16-2 moves into radio zone 15-1 after receiving a radio paging signal, so that its response signal reaches base station 14-1, there is a possibility that the two response signals will collide. Under these circumstances, the response signal from radio pager 16-1 can be received without problem by base station 14-1 because the code used for its direct sequence modulation was obtained from the base station ID signal of this base station. However, the response signal from radio pager 16-2 is not received by base station 14-1 because the code used for its direct sequence modulation (or in other words, the base station ID signal of base station 14-2) is not known.

FIG. 12 serves to explain the operation of receiving when signals which have been direct sequence modulated using different codes have collided. On the assumption that radio pagers 16-1 and 16-2 have received paging signals at different positions within the same frame and that the response signals from these radio pagers 16-1 and 16-2 have collided, FIG. 12 shows respectively the spectrum when the two direct sequence modulated response signals have collided, the spectrum obtained by multiplying the received signal by the spreading code used by radio pager 16-1, and the spectrum obtained by multiplying the received signal by the spreading code used by radio pager 16-2. If the spreading code used by radio pager 16-1 is known, use of this code ensures that the response signal can be received uninfluenced by the signal which has been direct sequence modulated by means of the other code. Likewise, if the spreading code used by radio pager 16-2 is known, use of this code ensures that the response signal of radio pager 16-2 can be received.

Thus the present embodiment enables the transmission rate of the response signals transmitted by a radio pager to be kept low regardless of an increase in the transmission capacity of the backward signal. Accordingly, the received power required at a base station does not increase and the power output from a radio pager does not have to be made larger. Low power consumption radio pagers can therefore be achieved.

In the foregoing explanation it was assumed that memory 23 stores only the base station ID signal of the base station to which memory 23 belongs, and that only response signals to paging signals from that base station are received. As noted above, with a configuration of this sort, in which paging signals have been transmitted simultaneously to a plurality of radio pagers which receive the same signal frequency $F_f$, if the response signal of a certain radio pager is received by the base station in an adjacent radio zone, or if a radio pager moves into an adjacent radio zone after receiving a paging signal, so that its response signal is received by the base station in that adjacent radio zone, then the response signal from this radio pager cannot be received. However, this leads to the possibility that the percentage of response signals received will decrease. It is therefore preferable to pre-register the base station ID signals of other base stations in memory 23, so that when a response signal which has been output from a radio pager is received, not only can a response signal to the base station ID signal transmitted from the base station to which memory 23 belongs be received by using the base station ID signal of that base station, but in addition it will be possible to receive response signals to the base station ID signals transmitted from other base stations, by using the base station ID signals of other, and in particular of adjacent, base stations.

FIG. 13 and FIG. 14 each show an example of a configuration of direct sequence modulated signal receiver 25 for receiving response signals to paging signals transmitted from other base stations. Here, by way of example, an explanation will be given of the case where K direct sequence modulated signals are to be received.

The example configuration shown in FIG. 13 is for receiving a plurality of direct sequence modulated signals in parallel. The received signal is split by distributor 42 into K sequences after unwanted frequency bands have been removed by passing the received signal through band-pass filter 41, each sequence is multiplied by a respective spreading code at multipliers 43-1 to 43-K, and signals of the required band are extracted by band-pass filters 44-1 to 44-K and demodulated by demodulators 45-1 to 45-K. Any required one of these demodulated outputs can be selected by selector 46 and output to line: terminator 21.

The configuration illustrated in FIG. 14 is one in which a plurality of direct sequence modulated signals are received simultaneously, stored, and then processed one by one. After passing through band-pass filter 51 the received signal is sampled at a high sampling rate in sampling circuit 52 and the results are stored in memory 53. These stored sample values are time-division processed by multiplier 54, band-pass filter 55 and demodulator 56, and the results of this processing are selected by selector 57. Namely, multiplier 54 successively multiplies by K spreading codes, band-pass filter 55 extracts signals in the required frequency band, and demodulator 56 sequentially demodulates these signals.

Configurations of the sort shown in FIG. 13 and FIG. 14 ensure that even if a plurality of response signals have collided, if each has been direct sequence modulated using a different code, and these codes are known, then each individual response signal can be received.

In the embodiment described above, when two radio pagers 16-1 and 16-2 which receive the same forward signal frequency $F_f$ are originally located in the same radio zone 15-1, then under these circumstances if paging signals are transmitted simultaneously to these two radio pagers 16-1 and 16-2, the response signals to the paging signals will be direct sequence modulated in accordance with the same code, leading to the possibility that the percentage of response signals received will decrease due to collision at base station 14-1. An embodiment which overcomes this potential problem will now be described.

FIG. 15 is a block diagram showing a radio paging system according to a second embodiment of the present invention. This embodiment comprises a plurality of base stations 61-1 to 61-n which convert to radio signals and transmit a paging signal sequence which has arrived from telephone network 12 via central station 13, and radio pagers 62-1 and 62-2 which receive at least part of the paging signal sequence transmitted from this plurality of base stations 14-1 to 14-n to respective radio zones 15-1 to 15-n. Base stations 61-1 to 61-n each comprise line terminator 21 which terminates the line to central station 13, signal insertion circuit 22 which inserts into the paging signal sequence a base station ID signal which differs for each base station, transmitter 24 for transmitting the paging signal sequence, direct sequence modulated signal receiver 25 for receiving direct sequence modulated response signals, address signal detection circuit 63 for detecting the addresses of the radio pagers to be paged, memory 64 which stores the base station ID signal and the addresses detected by address signal detection circuit 63, and arithmetic circuit 65 which obtains the codes used for the direct sequence modulation from the base station ID signal and the radio pager addresses stored in memory 64.

Each base station 61-1 to 61-n receives the paging signal sequence from central station 13 by means of line terminator 21, and outputs this paging signal sequence to address signal detection circuit 63 and signal insertion circuit 22. Address signal detection circuit 63 detects the address signal in each paging signal in the paging signal sequence and stores these address signals in memory 64. Signal insertion circuit 22 inserts into the input paging signal sequence the base station ID signal of the base station to which it belongs, this being stored in advance in memory 64 and differing for each base station, and outputs the result to transmitter 24. Transmitter 24 converts the output of signal insertion circuit 22 to a radio signal and transmits it at frequency $F_f$. The configuration shown in FIG. 8 or FIG. 9 is used as the configuration of the paging signal sequence output from transmitter 24.

Base stations 61 -1 to 61-n also receive, by means of direct sequence modulated signal receivers 25, a response signal of frequency $F_b$, which has been transmitted from a radio pager. In this second embodiment, this response signal has been direct sequence modulated using a code which is uniquely determined in accordance with the base station ID signal of the base station which transmitted the paging signal, and in accordance with the address of the radio pager which transmitted the response signal. Codes for receiving response signals are therefore obtained by arithmetic circuit 65 from the base station ID signal and the address signals which were detected in the transmitted paging signals, these having been stored in memory 64, and these codes are output by arithmetic circuit 65 to direct sequence modulated signal receiver 25. Assuming that there are $k_i$ addresses in frame i $k_i$ codes will be used for frame i. Direct sequence modulated signal receiver 25 receives response signals using these codes.

FIG. 16 shows the operating flow of radio pagers 62-1 and 62-2. The hardware configuration of radio pagers 62-1 and 62-2 is on a par with that of the first embodiment shown in FIG. 10, but how controller 32 determines the code is different.

Namely, when controller 32 has detected in the received paging signals a paging signal addressed to the radio pager to which controller 32 belongs, it notifies the user by means of an audible tone or other alert and outputs a response signal to transmitter 36. At the same time it outputs to transmitter 36 a code uniquely determined in accordance with the previously detected base station ID signal and the address of the radio pager to which it belongs. Transmitter 36 direct sequence modulates the response signal input from controller 32, using the code which has likewise been input from controller 32, and transmits the direct sequence modulated response signal to a base station.

As a result, because response signals are direct sequence modulated with a different code for each radio pager, a base station can receive the response signals transmitted respectively from a plurality of radio pagers even if it has transmitted paging signals simultaneously to a plurality of radio pagers which are located in the same radio zone and which receive the same forward signal frequency $F_f$.

In this second embodiment as well, as in the case of the first embodiment, the base: station ID signals of other base stations can also be registered in advance in memory 23 so that when a response signal output from a radio pager is to be received, the base station ID signals of other base stations can also be used, and not just the base station ID signal of the base station to which memory 23 belongs.

The illustrative descriptions given in the foregoing embodiments concerned the case where paging signals received by radio pagers have been time-division multiplexed. However, provided that the signal format permits base station ID signals to be inserted in the paging signal sequence, the present invention can be implemented in similar manner when the paging signal sequence is code-division multiplexed.

The code for the direct sequence modulation does not have to be obtained from the base station ID signal. It can alternatively be obtained from the position of the individual paging signal within a frame, or by a combination of this and the base station ID signal. An embodiment of this sort will now be described.

FIG. 17 is a block diagram showing a radio paging system according to a third embodiment of the present invention. This embodiment comprises a plurality of base stations 71-1 to 71-n which convert to radio signals and transmit a paging signal sequence which has arrived from telephone network 12 via central station 13, and radio pagers 72-1 and 72-2 which receive at least part of the paging signal sequence which has been, 15 transmitted from this plurality of base stations 71-1 to 71-n to respective radio zones 15-1 to 15-n. Each base station 71-1 to 71-n comprises line terminator 21 which terminates the line to central station 13, transmitter 24 for transmitting the paging signal sequence, direct sequence modulated signal receiver 25 for receiving direct sequence modulated response signals, address signal detection circuit 73 for detecting the paging signal address signals and their positions; memory 74 for storing the positions of the detected address signals, and arithmetic circuit 75 for obtaining codes for direct sequence modulation from the information stored in this memory 74.

In this radio paging system, radio pagers 72-1 and 72-2 direct sequence modulate a response signal using a code obtained in accordance with the position of the paging signal addressed to itself in the paging signal sequence which has been transmitted from base stations 71-1 to 71-n, namely, in accordance with what number of paging signal that paging signal is in the paging signal sequence. Meanwhile, at base stations 71 -1 to 71-n, the direct sequence modulated response signals from radio pagers 72-1 and 72-2 are received using the codes obtained in accordance with the position of the individual paging signals within the transmitted paging signal sequence. This operation will now be explained in greater detail.

Base stations 71-1 to 71-n each receive a paging signal sequence from central station 13 using line terminator 21, supply this paging signal sequence to transmitter 24, and also supply it to address signal detection circuit 73. Transmitter 24 converts this paging signal sequence to a radio signal (a radio wave) and transmits it at frequency $F_f$. Meanwhile, address signal detection circuit 73 detects the address signal of each paging signal in the input paging signal sequence. At the same time it detects, in respect of a frame in which the paging signals with those address signals have been inserted, the position of that frame within the paging signal sequence (i.e., its transmission order within the frame sequence), and the position (i.e., the transmission order) of those paging signals within that frame. This information is stored in memory 74.

When radio pager 72-1 or 72-2 receives a paging signal addressed to itself from the paging signal sequence which has been transmitted from transmitter 24, it obtains a code for direct sequence modulation in accordance with the position within the frame sequence of the frame in which that paging signal has been inserted, and in accordance with the position within that frame of that paging signal, and sends back a response signal which has been direct sequence modulated using that code.

This response signal is received by direct sequence modulated signal receiver 25 of base stations 71-1 to 71-n. The spreading code which enables direct sequence modulated signal receiver 25 to receive the response signal is obtained by means of arithmetic circuit 75. Namely, arithmetic circuit 75 uses the transmission position of each address signal, which has been stored in memory 74, to determine the respective code required to receive the corresponding response signal. The received response signal is transmitted to central station 13 via line terminator 21 and is reported via telephone network 12 to telephone terminal 11 on the paging side.

FIG. 18 shows an example of the operating flow of radio pagers 72-1 and 72-2. The hardware configuration of radio pagers 72-1 and 72-2 is on a par with that shown in FIG. 10, but the operation of controller 32 is slightly different.

Namely, receiver 31 receives a paging signal sequence which has been transmitted from a base station. Controller 32 checks whether or not there is a paging signal addressed to the radio pager to which it belongs in the paging signal sequence received by receiver 31, and if such a paging signal is detected, it outputs an audible tone or other alert from speaker 33, thereby notifying the user that he or she has been paged. When a message has been added to this paging signal, controller 32 also displays this message on display 35 by way of driver 34. In addition, when controller 32 has detected a paging signal addressed to the radio pager to which it belongs, it outputs a response signal to transmitter 36 and also outputs to transmitter 36, as a spreading code, the code uniquely determined by the transmission position of that paging signal. Transmitter 36 direct sequence modulates the response signal which has been input from controller 32, using the code likewise input from controller 32, and transmits the direct sequence modulated response signal to the base station.

To determine the position of the paging signal, it is necessary to decide on an initial position at the base station and at the radio pager. To do this, the allocation of codes is reset at a certain time. For example, code allocation can be reset at a certain specific time each day such as midnight, or once an hour. Alternatively, it can be reset every M frame sequences each comprising m frames. A radio pager therefore obtains a code for direct sequence modulation on the basis of what number of paging signal a paging signal is after resetting, and a base station obtains a code for receiving a response signal on the basis of what place the paging signal occupied in the transmission order after resetting.

FIG. 19 shows another example of the operating flow of radio pagers 72-1 and 72-2. In the operating flow illustrated in FIG. 18, the transmission position of a paging signal was determined on the basis of receiving all the frames of the paging signal sequence. However, a radio pager generally performs intermittent receiving, thereby lowering power consumption. Namely, it receives only at least some pre-allocated frames of a frame sequence comprising a plurality m of frames of predetermined signal length which comprise the paging signal sequence. In such a case the spreading code can be obtained on the basis of the position of the paging signal in a series of intermittently received frames.

FIG. 20 and FIG. 21 show examples of the allocation of spreading codes in a series of intermittently received frames. The spreading code allocation example shown in FIG. 20 is based on use of the signal configuration illustrated in FIG. 2. In this example it is assumed that spreading codes up to $C_{q-1}$ have been allocated to paging signals of previous, frames i. Accordingly, spreading codes $C_q$, $C_{q+1}$, ..., $C_{q+ki-1}$ are allocated to paging signals i-1, i-2, ..., i-$k_i$ in frame i in the new frame sequence, in correspondence with their transmission order. Moreover, in frame i in the next frame sequence, spreading codes $C_{q+ki}$, $C_{q+ki+1}$, ..., $C_{q+ki+ri-1}$ are allocated to paging signals i-i, i-2, ..., i-ri. The spreading code allocation example shown in FIG. 21 is based on use of the signal configuration of RCR STD-43. In this case, spreading codes $C_q$, $C_{q+1}$, ..., $C_{q+ki-1}$ are allocated in correspondence with the order of the address signals in the address signal field.

When utilizing these allocation examples, the code allocation is reset at a certain time in order to determine the position of the paging signals, as in the case explained with reference to FIG. 18. A radio pager obtains a code for direct sequence modulation in accordance with what number of paging signal a paging signal addressed to that radio pager is within a plurality of frames received subsequent to this reset. A base station obtains codes for receiving response signals in accordance with the order of the paging signals in the frames with the same frame number in the frame sequences which have been transmitted subsequent to the resetting.

FIG. 22 shows another example of the operating flow of radio pagers 72-1 and 72-2, and FIG. 23 and FIG. 24 show examples of the allocation of spreading codes in each frame for this operating flow. This example differs from the example of FIG. 19 in that spreading codes are obtained on a per frame basis. Namely, in terms of the operating flow of FIG. 19, it is equivalent to re-setting the code allocation at each frame.

Figure 1:
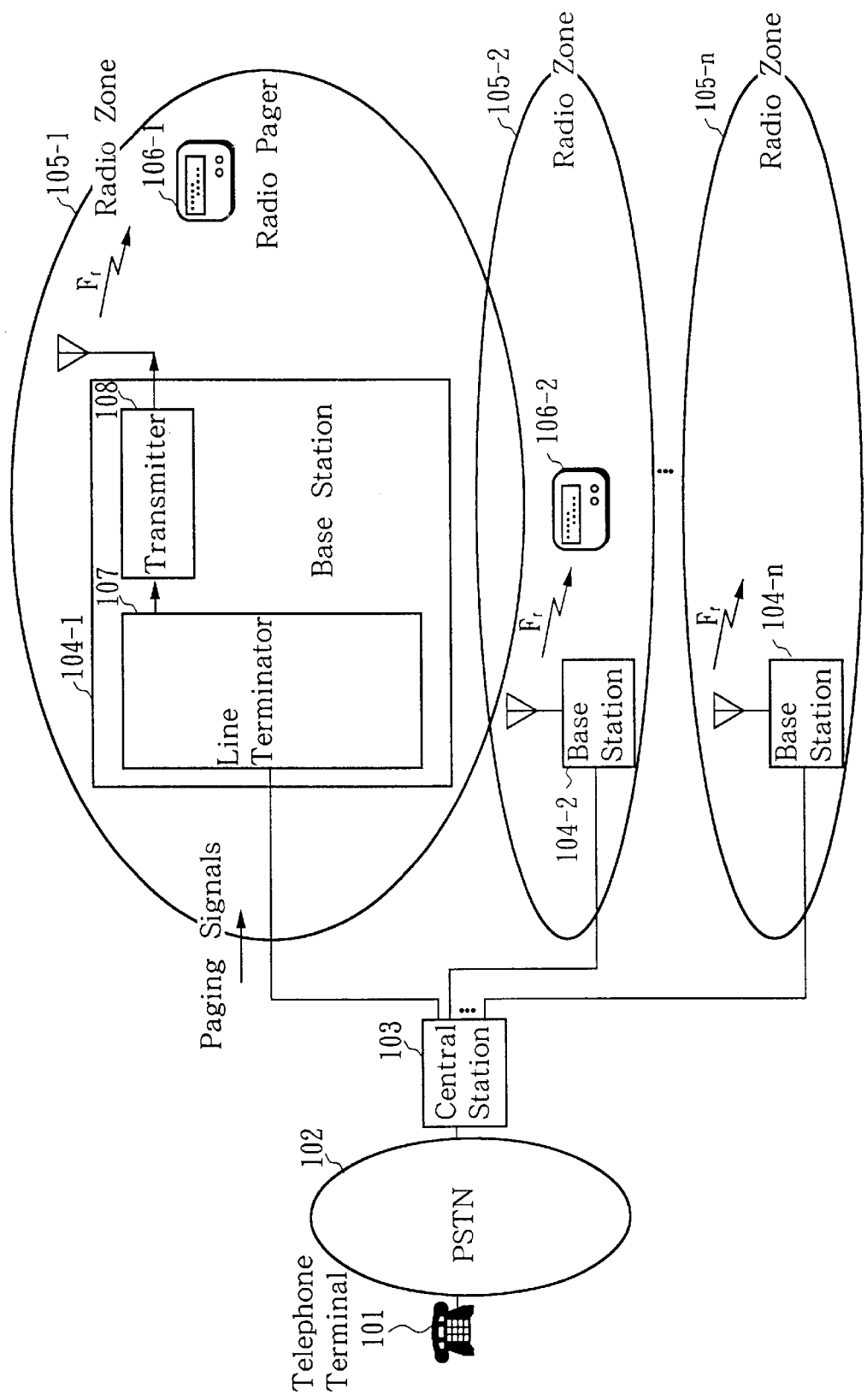
FIG. 1 is a block diagram showing a conventional one-way radio paging system.
Figure 2:
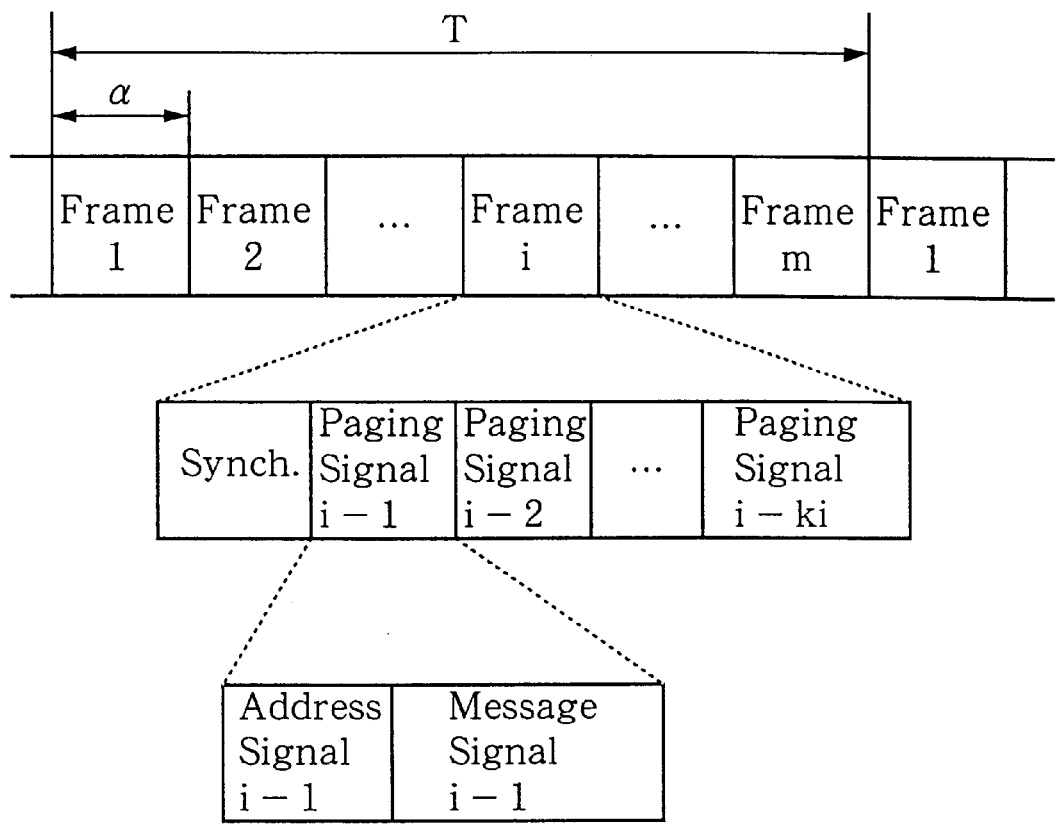
FIG. 2 shows the configuration of a paging signal sequence which a radio paging receiver receives in a conventional one-way radio paging system.
Figure 3:
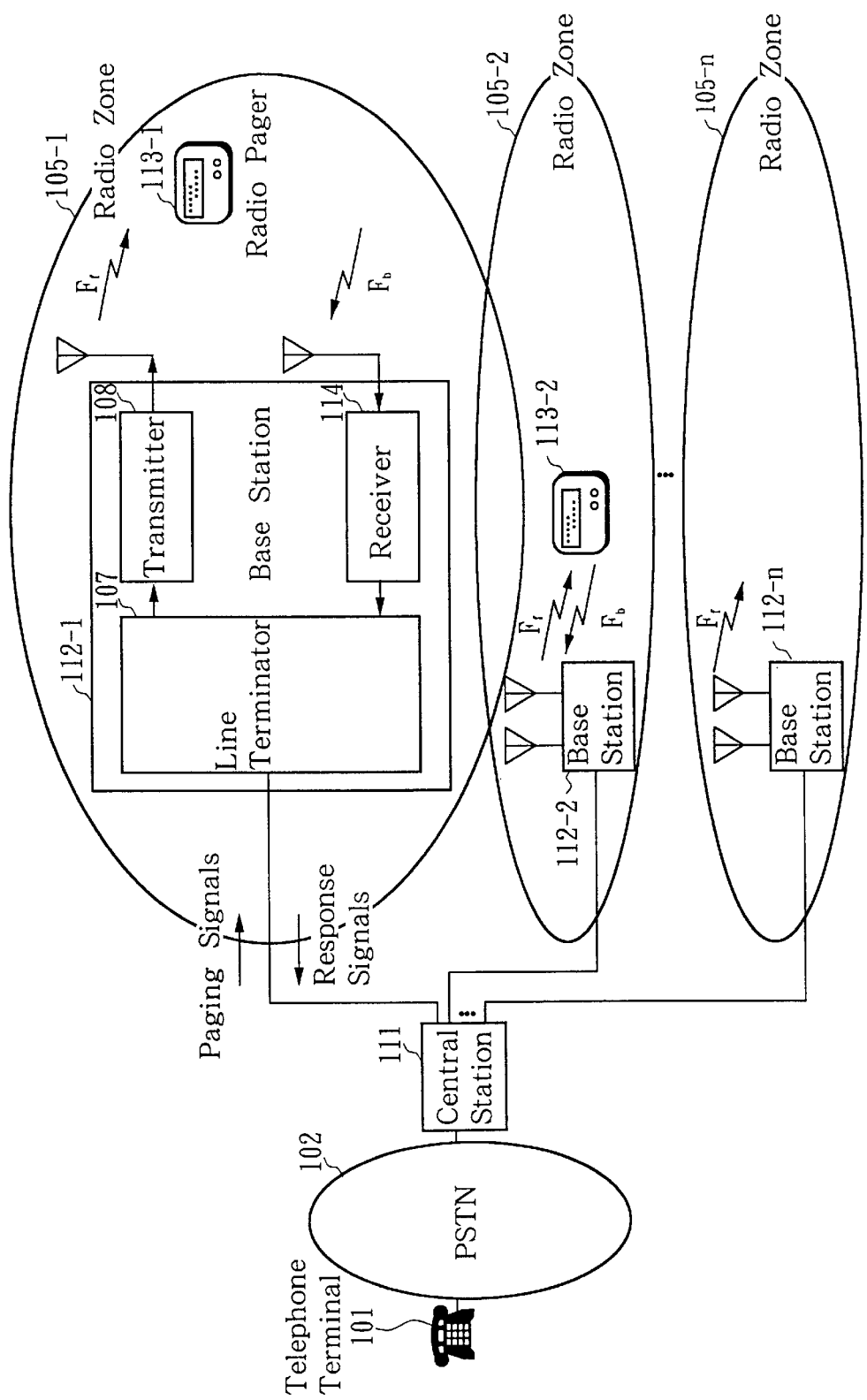
FIG. 3 is a block diagram showing a conventional two-way radio paging system.

The spreading code allocation example shown in FIG. 23 is based on the use of the signal configuration illustrated in FIG. 2. Namely, spreading codes $C_1$, $C_2$, ..., $C_{ki}$ are allocated to paging signals i-1, i-2, ..., i-$k_i$ in frame i, in correspondence with their transmission order. It follows that in the case of a radio pager which intermittently receives frame i, if the j-th paging signal i-j (j=1, 2, ..., $k_i$)is addressed to that radio pager, the pager direct sequence modulates a response signal using spreading code $C_j$.

The spreading code allocation example shown in FIG. 24 is based on the use of the signal configuration of RCR STD-43 illustrated in FIG. 9. In this case, spreading codes $C_1$, $C_2$, ..., $C_{ki}$ are allocated in correspondence with the order of the address signals in the address signal field.

FIG. 25 shows yet another example of the operating flow of radio pagers 72-1 and 72-2, while FIG. 26 and FIG. 27 show examples of the allocation of spreading codes for this operating flow.

In order to obtain the spreading codes, this operating flow uses not only the position of the paging signals within a frame, but also the position of that frame within the frame sequence. The position within the frame sequence of a frame to be received is predetermined, and by detecting the transmission position of the paging signals within the frame, the transmission position of those paging signals within the frame sequence can be found. Different spreading codes can therefore be allocated not only to the paging signals within a frame, but also within the frame sequence.

When the signal configuration shown in FIG. 2 is used, then as shown in FIG. 26., spreading codes $C_{i,1}$, $C_{i,2}$, ..., $C_{i,ki}$ are allocated to paging signals i-1, i-2, ..., i-$k_i$ in frame i, in correspondence with their transmission position, and spreading codes $C_{j,1}$, $C_{j,2}$, ..., $C_{j,kj}$ are allocated to paging signals j-1, j-2, ..., j-$k_j$ in frame j. It follows that in the case of a radio paging receiver which intermittently receives frame i, if the q-th paging signal i-q within that frame i (q=1, 2, ..., $k_i$) is addressed to that radio paging receiver, the receiver direct sequence modulates the response signal using spreading code $C_{i,q}$.

When the signal configuration given in RCR STD-43 is used as the signal format, then as shown in FIG. 27 spreading codes are allocated in correspondence with the order of the address signals in the address signal field.

FIG. 28 shows a further example of the operating flow of radio pagers 72-1 and 72-2, while FIG. 29 and FIG. 30 give examples of the allocation of spreading codes for this operating flow.

In order to obtain the spreading codes, this operating flow uses not only the position of the paging signals within a frame and the position of that frame within the frame sequence, but also the time at which that frame sequence was transmitted. As a result, different spreading codes can be used in frame i of a frame sequence which was transmitted at time to and in frame i of a frame sequence which was transmitted at time $t_0+T$.

When the signal configuration shown in FIG. 2 is used, then as shown in FIG. 29, spreading codes $C_{t0,i,1}$, $C_{t0,i,2}$, ..., $C_{t0,i,ki}$ are allocated to paging signals i-1, i-2, ..., i-$k_i$ in frame i of the frame sequence transmitted at time to, in correspondence with their transmission order, and spreading codes $C_{t0+T,i,1}$, $C_{t0+T,i,2}$, ..., $C_{t0+T,i,ri}$ are allocated to paging signals i-1, i-2, ..., i-$r_i$ in frame i of the frame sequence transmitted at time $t_{0+T}$.

When the signal configuration given in RCR STD-43 is used, then as shown in FIG. 30, spreading codes $C_{t0,i,1}$, $C_{t0,i,2}$, ..., $C_{t0,i,ki}$, $C_{t0+T,i,1}$, $C_{t0+T,i,2}$, ..., $C_{t0+T,i,ri}$ are allocated in correspondence with the order of the address signals in the address signal field.

The examples of operation shown respectively in FIG. 19, FIG. 22, FIG. 25 and FIG. 28 enable the same spreading codes to be determined at both the base station side and the radio pager side simply as a result of the radio pager receiving allocated frames. Pagers can therefore perform intermittent reception and thereby reduce power consumption.

As has been explained above, the present invention enables the transmission rate of the response signals transmitted by a radio pager to be kept low even if the transmission capacity of the backward signal is increased. Moreover, according to the present invention the received power required at a base station does not increase and the power output from a radio pager does not have to be made larger. The effect of the present invention is therefore the ability to reduce the power consumption of radio pagers.

What is claimed is:

1. A radio paging system comprising:
   a plurality of base stations which transmit a paging signal sequence, each base station comprising means for inserting a base station ID signal, which differs from each base station, in the paging signal sequence, and at least one of the plurality of base stations comprising a response receiver; and
   a radio pager which receives a received signal containing at least part of the paging signal sequence transmitted from the plurality of base stations, the radio pager comprising a response transmitter that sends back a response signal addressed to itself contained in the received signal, the response transmitter comprising a direct sequence modulator to modulate the response signal to the base station, the direct sequence modulator using a code obtained from the base station ID signal to impose a spreading code onto the response signal for identifying the response signal from the radio pager to the base station of the plurality of base stations to which the response signal belongs, wherein
   the response receiver further comprises:
      a modulated signal receiver that receives the direct sequence modulated response signal from the radio pager and obtains the spreading code of the base station to which it belongs and the address of the paged radio pager; and
      a storage element storing pre-registered base station ID signals transmitted from other base stations, wherein the response receiver receives response signals associated with base station ID signals from the other base stations.

2. A radio paging system comprising:
   a plurality of base stations which transmit a paging signal sequence, at least one of the plurality of base stations having a response receiver; and
   a radio pager which receives at least some of the paging signals of the paging signal sequence, the radio pager comprising a response transmitter that transmits a response signal when a paging signal addressed to the radio pager to which it belongs is contained among the received paging signals, the response transmitter comprising a direct sequence modulator that modulates the response signal using a code obtained according to the position within the transmitted paging signal sequence of the paging signal addressed to the radio pager to which it belongs to impose a spreading code onto the response signal for identifying the response signal from the radio pager, wherein
   the response receiver further comprises a receiver that receives the direct sequence modulated response signal from the radio pager using a code obtained according to the position of the individual paging signal within the transmitted paging signal sequence.

3. A radio paging system according to claim 2, wherein:
   the response transmitter further comprises means for obtaining the code for the direct sequence modulation according to a number associated with the paging signal addressing the radio pager, starting from a predetermined point in time; and
   the response receiver further comprises means for obtaining the code for receiving the response signal according to an order of the paging signals transmitted starting from the predetermined point in time.

4. A radio paging system according to claim 2, wherein:
   the paging signal sequence is comprised of units having a frame sequence comprising a plurality of frames of predetermined signal length joined together, each frame comprising a plurality of paging signals;
   the radio pager receives at least one pre-allocated frame within each frame sequence; and
   the response transmitter and the response receiver each comprises means for obtaining the code for the direct sequence modulation according to a position of a paging signal within a frame.

5. A radio paging system according to claim 4, wherein:
   the response transmitter further comprises means for obtaining the code for the direct sequence modulation according to a number associated with the paging signal addressing the radio pager, within a plurality of frames received after a predetermined point in time; and
   the response receiver further comprises means for obtaining codes for receiving response signals according to an order of the paging signals in the frames with the same frame number in the frame sequences transmitted after the predetermined point in time.

6. A radio paging system according to claim 2, wherein:
   the paging signal sequence is a signal wherein each unit thereof is a frame sequence comprising a plurality of frames of predetermined signal length joined together, each frame comprising a plurality of paging signals;

the radio pager receives at least one pre-allocated frame within each frame sequence; and the response transmitter and the response receiver each comprises means for obtaining the code for the direct sequence modulation according to a position of a paging signal within a frame and a position of that frame within a frame sequence.

7. A radio paging system according to claim 2, wherein:

the paging sequence is a signal wherein a unit thereof is a frame sequence comprising a plurality of frames of predetermined signal length joined together, each frame comprising a plurality of paging signals;

the radio pager receives at least one pre-allocated frame within each frame sequence; and the response transmitter and the response receiver each comprises means for obtaining the code for the direct sequence modulation according to a position of a paging signal within a frame, a position of that frame within the frame sequence, and a time at which that frame is transmitted.

8. A radio pager comprising:

a receiver that receives at least part of a paging signal sequence transmitted from a base station and a detector that detects a paging signal addressed to itself;

a transmitter that transmits a response signal to a paging signal addressed to itself, the transmitter further comprising a direct sequence modulator that modulates the response signal, the direct sequence modulator using a code obtained in accordance with a position of the paging signal in the paging signal sequence addressed to the radio pager to which the transmitter belongs for modulating the response signal.

9. A radio pager according claim 8, wherein direct sequence modulator further comprises means for obtaining the code according to a number associated with the received signal addressed to the radio pager, among paging signals received after a predetermined point in time.

10. A radio pager according to claim 8, wherein:

the paging signal sequence transmitted from a base station is a signal wherein a unit thereof is a frame sequence comprising a plurality of frames of predetermined signal length joined together, each frame comprising a plurality of paging signals;

the detector further comprises an intermittent receiver that receives at least one pre-allocated frame from each frame sequence; and wherein the direct sequence modulator further comprises means for obtaining the code for the direct sequence modulation according to the position of a paging signal within the frame.

11. A radio pager according to claim 10, wherein the means for obtaining the code further comprises means for determining the code according to a number associated with the paging signal addressing the radio pager, within a plurality of frames intermittently received after a predetermined point in time.

12. A radio pager according to claim 8, wherein:

the paging signal sequence transmitted from a base station is a signal wherein a unit thereof is a frame sequence comprising a plurality of frames of predetermined signal length joined together and wherein each frame comprises a plurality of paging signals;

the detector further comprises an intermittent receiver that receives at least one pre-allocated frame from each frame sequence; and wherein the direct sequence modulator comprises means for obtaining the code for the direct sequence modulation according to a position of a paging signal within the frame and a position of that frame within the frame sequence.

13. A radio pager according to claim 8, wherein:

the paging signal sequence transmitted from a base station is a signal wherein a unit thereof is a frame sequence comprising a plurality of frames of predetermined signal length joined together, each frame comprising a plurality of paging signals;

the detector further comprises an intermittent receiver that receives at least one pre-allocated frame from each frame sequence; and wherein the direct sequence modulator further comprises means for obtaining the code for the direct sequence modulation according to a position of a paging signal within the frame, a position of that frame within the frame sequence, and a time at which that frame or frame sequence was transmitted.

14. A radio paging system comprising: a plurality of base stations that transmit a paging signal sequence, each of the plurality of base stations comprises means for inserting a base station ID signal, which differs from each base station, in the paging signal sequence to be transmitted;

a radio pager that receives a received signal containing at least part of the paging signal sequence transmitted from the plurality of base stations, the radio pager comprising a response transmitter that sends back a response signal addressed to itself contained in the received signal, the response transmitter comprising a direct sequence modulator to modulate the response signal to the base station, the direct sequence modulator using a code obtained from the base station ID signal to impose a spreading code onto the response signal from the radio pager to the base station of the plurality of base stations to which the response signal belongs, the direct sequence modulator further comprising a device for obtaining the code from the base station ID signal and from the address of the radio pager to which it belongs, wherein at least one of the plurality of base stations comprises a response receiver that receives the response signal, the response receiver further comprising:

a device for obtaining the code required to receive the response signal from the base station ID signal transmitted from the base station to which it belongs, and from the address of the paged radio receiver;

a modulated signal receiver that receives the direct sequence modulated response signal from the radio pager by means of a code obtained from the base station ID signal of the base station to which it belongs; and a storage element storing pre-registered base station ID signals transmitted from other base stations, wherein the response receiver receives, in addition to response signals for the base station ID signal associated with the base station receiving the response signal, response signals associated with other base station ID signals.

* * * * *